US009381583B2

(12) United States Patent
Fang

(10) Patent No.: US 9,381,583 B2
(45) Date of Patent: Jul. 5, 2016

(54) PRISMATIC AND CYLINDRICAL CUTTING INSERTS

(71) Applicant: Kennametal Inc., Latrobe, PA (US)

(72) Inventor: X. Daniel Fang, Brentwood, TN (US)

(73) Assignee: KENNAMETAL INC., Latrobe, PA (US)

( * ) Notice: Subject to any disclaimer, the term of this patent is extended or adjusted under 35 U.S.C. 154(b) by 242 days.

(21) Appl. No.: 14/178,628

(22) Filed: Feb. 12, 2014

(65) Prior Publication Data

US 2015/0224586 A1  Aug. 13, 2015

(51) Int. Cl.
| B23C 5/00 | (2006.01) |
| B23C 5/20 | (2006.01) |
| B23C 5/06 | (2006.01) |
| B23C 5/22 | (2006.01) |

(52) U.S. Cl.
CPC ... *B23C 5/20* (2013.01); *B23C 5/06* (2013.01); *B23C 5/2204* (2013.01); *B23C 2200/04* (2013.01); *B23C 2200/286* (2013.01); *B23C 2200/363* (2013.01); *B23C 2210/168* (2013.01); *B23C 2226/125* (2013.01); *B23C 2226/315* (2013.01); *Y10T 407/22* (2015.01); *Y10T 407/23* (2015.01); *Y10T 407/235* (2015.01)

(58) Field of Classification Search
CPC B23C 5/20; B23C 2200/04; B23C 2200/363; B23C 2200/286
See application file for complete search history.

(56) References Cited

U.S. PATENT DOCUMENTS

| 5,145,295 | A | 9/1992 | Satran |
| 6,193,446 | B1 | 2/2001 | Astrom et al. |
| 7,070,363 | B2 | 7/2006 | Long, II et al. |
| 7,549,824 | B2 * | 6/2009 | Agic ........................ B23B 27/16 407/113 |
| 7,905,688 | B2 * | 3/2011 | Ertl ........................... B23C 5/10 407/113 |
| 7,909,544 | B2 * | 3/2011 | Jansson ..................... B23C 5/06 407/100 |
| 8,043,031 | B2 * | 10/2011 | Sung .................... B23B 27/1622 407/113 |
| 8,985,247 | B2 * | 3/2015 | Tamez .................... E21B 10/46 175/430 |
| 2003/0047047 | A1 * | 3/2003 | Satran ...................... B23C 5/06 83/69 |
| 2007/0071561 | A1 | 3/2007 | Agic |
| 2007/0217875 | A1 * | 9/2007 | Fouquer ................. B23B 51/048 407/113 |
| 2012/0170986 | A1 | 7/2012 | Nam et al. |
| 2013/0121775 | A1 | 5/2013 | Dudzinsky et al. |

(Continued)

FOREIGN PATENT DOCUMENTS

| DE | 2522735 A1 | 5/1975 |
| DE | 19654815 A1 | 7/1998 |
| DE | 10222445 A1 | 12/2003 |
| DE | 102006028729 A1 | 12/2007 |

(Continued)

OTHER PUBLICATIONS

Jan. 15, 2015—First Office Action—DE 102015102059-K-05864-DE-NP.

*Primary Examiner* — Will Fridie, Jr.
(74) *Attorney, Agent, or Firm* — Larry R. Meenan

(57) ABSTRACT

A prismatic and cylindrical cutting insert for long edge rotary milling applications has multiple indexable cutting edges ranging from four to six or even more depending on the actual milling applications. Each cutting edge of a prismatic or cylindrical cutting insert provides a positive cutting geometry and is equivalent to an indexable cutting edge of a traditional single-sided parallelogram-shaped cutting insert having two indexable cutting edges (often referred as A-Style insert). The prismatic and cylindrical (including tapered or conical) cutting insert may be used for machining a wide range of materials including difficult-to-machine materials, cast-iron and alloys, aluminum and alloys, carbon steels, and fiber reinforced composites.

17 Claims, 17 Drawing Sheets

(56) References Cited

U.S. PATENT DOCUMENTS

2013/0129433 A1 5/2013 Matsumoto
2013/0183108 A1 7/2013 Zettler

FOREIGN PATENT DOCUMENTS

| JP | 05016011 A | 1/1993 |
|---|---|---|
| WO | WO2008121056 A1 | 10/2008 |

* cited by examiner

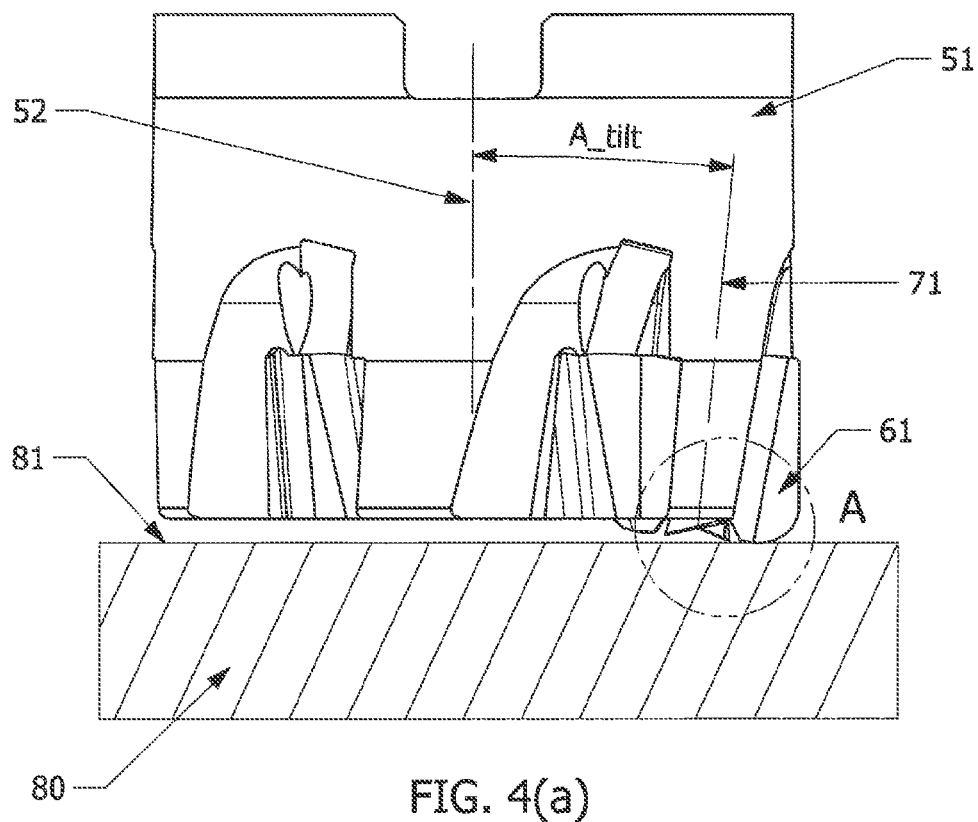
FIG. 4(a)
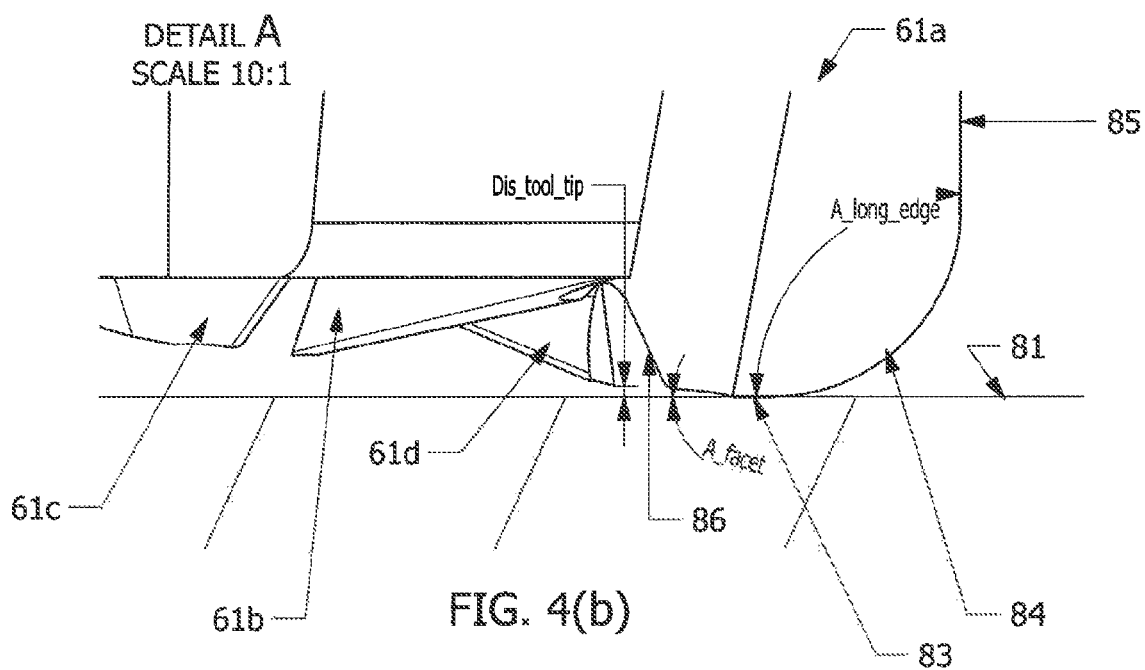
FIG. 4(b)
FIGURE 4

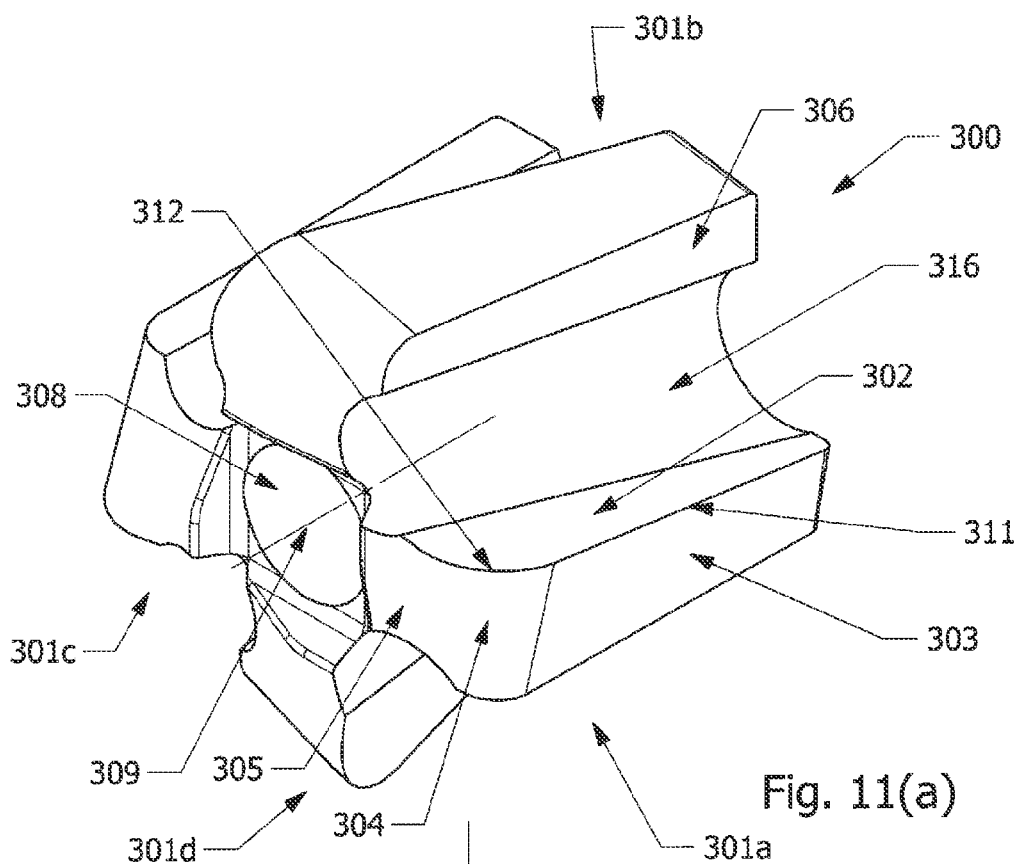
Fig. 11(a)
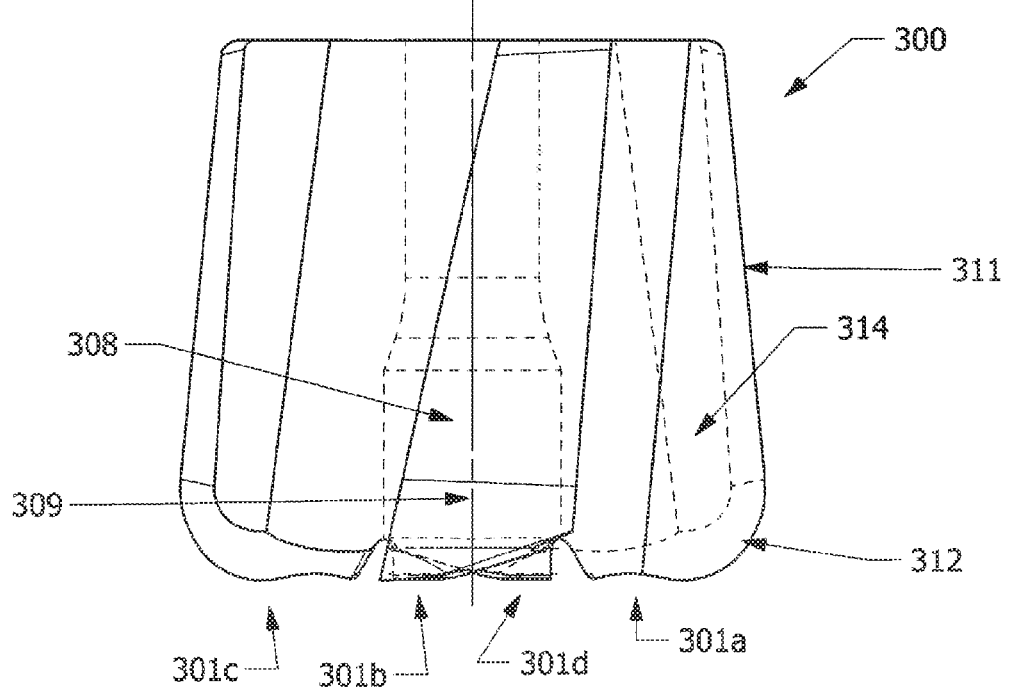
FIG. 11(b)
FIGURE 11

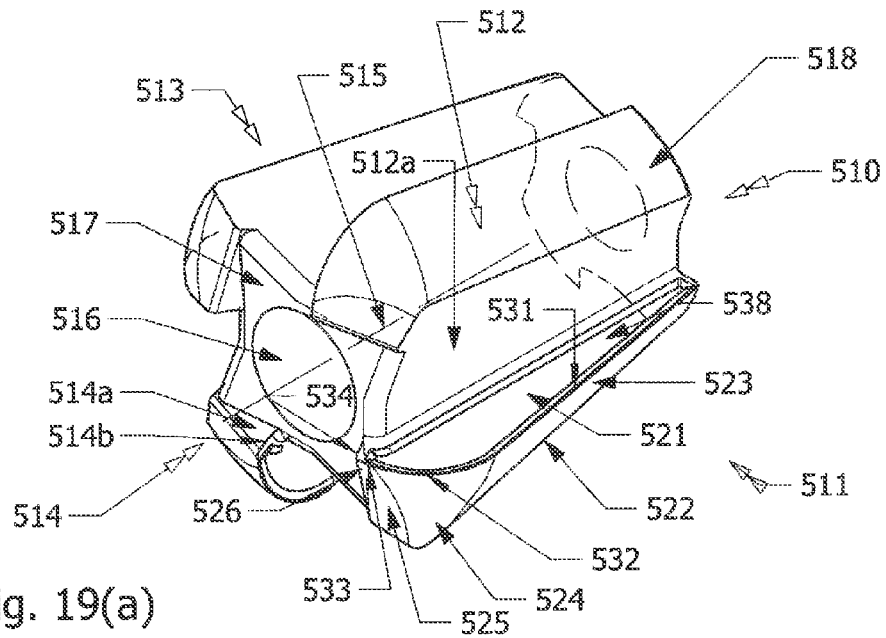
Fig. 19(a)
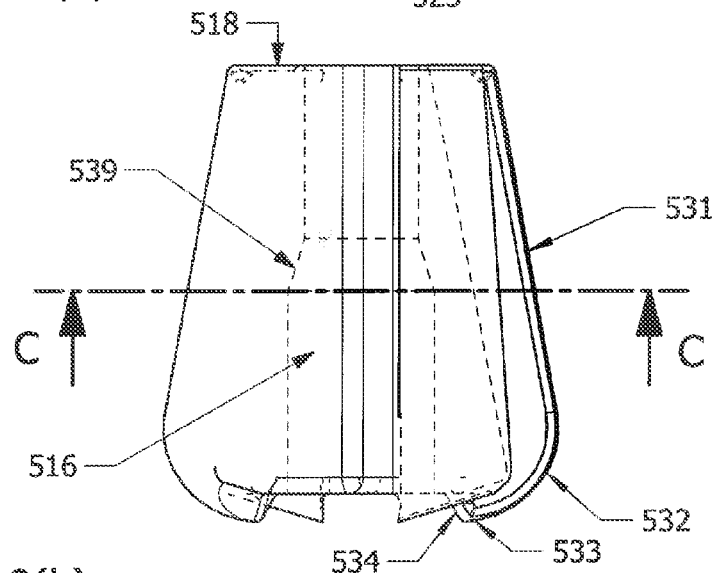
Fig. 19(b)
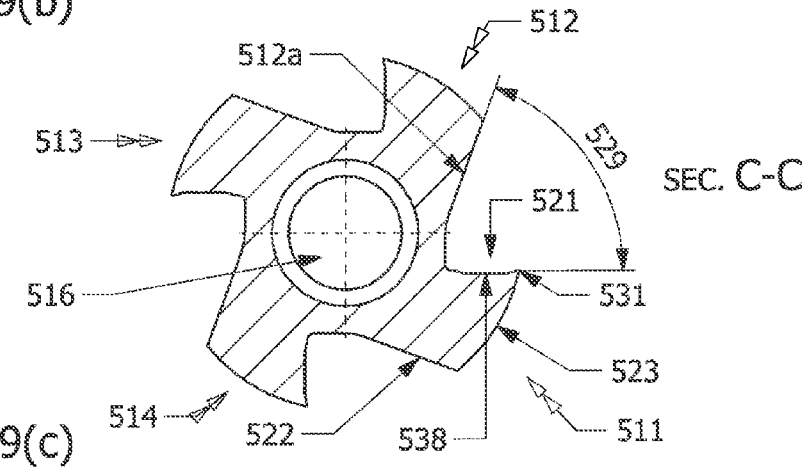
Fig. 19(c)
FIGURE 19

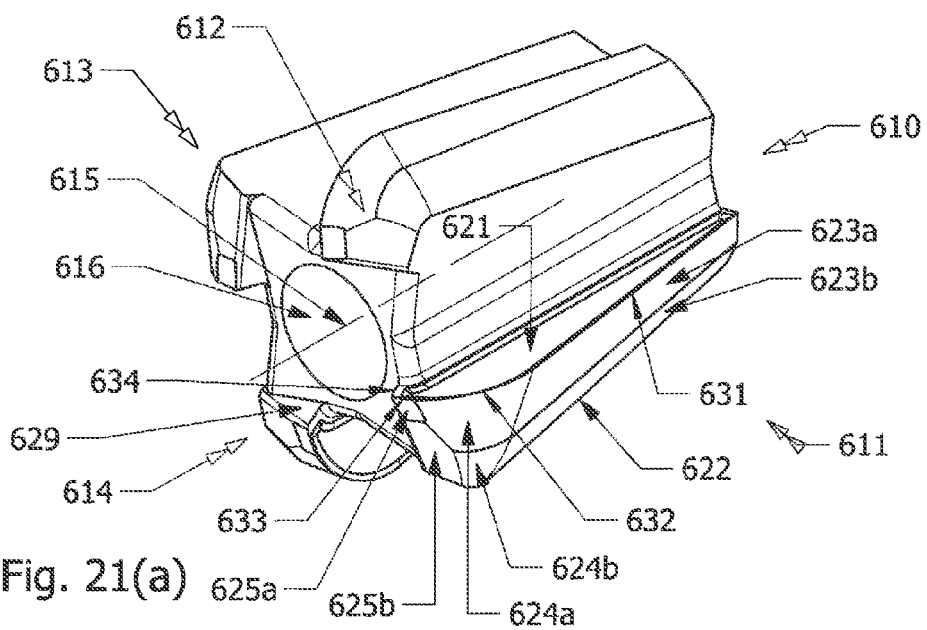
Fig. 21(a)
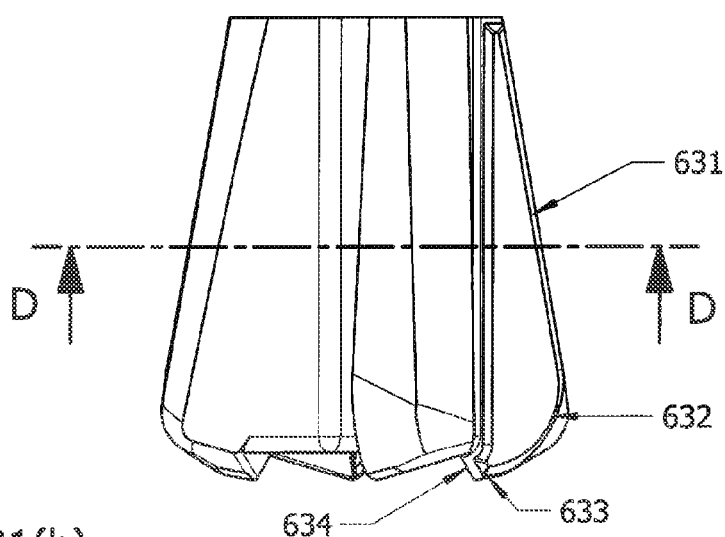
Fig. 21(b)
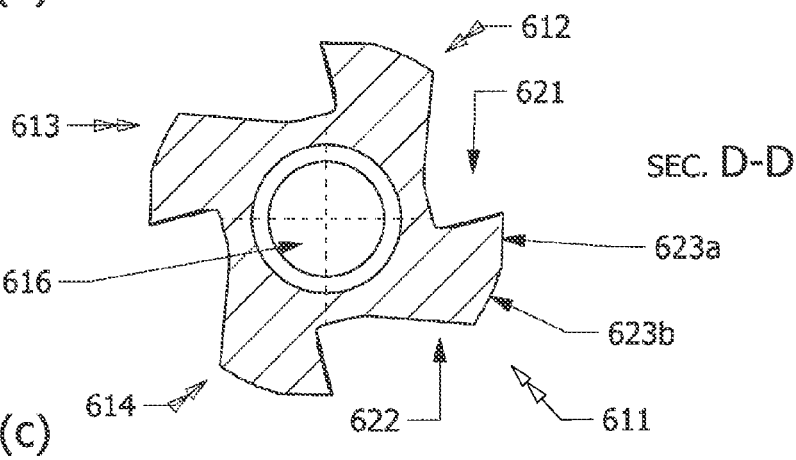
Fig. 21(c)
FIGURE 21 ical, cylindrical cutting inserts, and tool holders.

PRISMATIC AND CYLINDRICAL CUTTING INSERTS

BACKGROUND OF THE INVENTION

1. Field of the Invention

The present disclosure is directed to indexable cutting inserts and tool holders for parallelogram-shaped cutting inserts with positive cutting geometry. In one non-limiting embodiment, cutting inserts according to the present disclosure are particularly useful in peripheral rotary milling applications for machining difficult-to-machine materials. In another non-limiting embodiment, cutting inserts according to the this disclosure are uniquely useful in peripheral rotary milling applications that generates segmented chips, for instance, when machining cast-iron and alloys, medium to high carbon steels, fiber reinforced composite materials.

2. Description of Related Art

It is well known that cutting inserts suffer from a limited service life in peripheral rotary milling applications, especially when machining difficult-to-machine materials which include, for example, specialty metals such as titanium and titanium alloys, nickel and nickel alloys, superalloys, certain exotic metals, and fiber reinforced polymer composite. Cutting inserts comprising a positive cutting geometry on the axial cutting face and the radial cutting face are commonly employed in milling operations involving the use of a peripheral rotary tool holder with an indexable capability. The positive cutting geometry of the cutting inserts reduces the cutting forces resulting in a more efficient milling operation. A single-sided parallelogram-shaped cutting insert (often referred as A-Style insert) has a generally parallelogram-shaped profile when viewed from a point above the insert's top surface, with two long sides forming two main cutting edges and two short sides forming two minor cutting edges. These types of cutting inserts provide more efficient machining due to their positive cutting edges by providing the capability of a larger depth of cut due to the longer parallelogram cutting edges.

Using double-sided cutting inserts is getting popular simply because the doubled number of available cutting edges contributes to cost reduction benefits for both cutting tool end users and cutting tool manufacturers. However, the geometric design of a double-sided cutting insert for peripheral rotary milling is a more challenging task compared to a traditional single-sided cutting insert, because of the complexity of positioning a double-sided cutting insert in an insert pocket on a cutting tool holder in order to achieve sufficient positive cutting geometry all around the engaging cutting edge. A double-sided parallelogram-shaped cutting insert has a generally parallelogram-shaped profile when viewed from a point above the insert's top surface, with two long sides forming two main cutting edges and two short sides forming two minor cutting edges on each of the top and bottom faces. A double-sided parallelogram-shaped cutting insert comprises a negative cutting geometry at least on the radial cutting face.

Efforts in the industry to develop new or improved parallelogram-shaped cutting inserts have been directed toward achieving reduced cutting forces, reduced power consumption, increased cutting edge strength, and increased tool life. From the point view of geometrical design, maintaining a positive cutting action has been a fundamental goal of these efforts. However, conventional parallelogram-shaped cutting inserts for milling operation are only limited to either two positive cutting edges for a single-sided cutting insert or four generally negative cutting edges for a double-sided cutting insert.

SUMMARY OF THE INVENTION

The invention provides an innovative and unique concept for designing a parallelogram-shaped cutting insert. The cutting insert of the present invention has a prismatic and/or cylindrical shape having multiple positive cutting teeth with positive cutting geometry all around the cutting edges. In other words, each cutting tooth is equivalent to an indexable cutting edge for a single-sided parallelogram cutting insert (two positive cutting edges), however, the number of cutting teeth can be three, four, five and even more. This allows more available long and positive cutting edges than a traditional single-sided parallelogram cutting insert. In addition, a prismatic or cylindrical cutting insert according to this invention disclosure may demonstrate advantages over a prior art double-sided parallelogram cutting insert (negative geometry in general) by providing at least same number but positive long cutting edges.

According to one non-limiting aspect of the present disclosure, a cutting insert having prismatic and/or cylindrical (including tapered or conical) shape comprises multiple cutting teeth each being equivalent to a cutting edge of a single-sided parallelogram-shaped cutting insert (referred in cutting tool industries as A-style cutting insert having two available cutting edges). A prismatic and cylindrical cutting according to present invention has multiple indexable positive cutting edges ranging from four to six or even more depending on the actual milling applications. The prismatic and cylindrical cutting insert may be used for machining a wide range of materials including difficult-to-machine materials, cast-iron and alloys, aluminum and alloys, carbon steels, and fiber reinforced composites.

A generally prismatic and cylindrical cutting insert according to present invention disclosure comprises multiple indexable cutting teeth and each cutting tooth comprises a top face; at least one radial clearance face intersecting the top face; at least one axial clearance face intersecting the top face, and at least one conic clearance face intersecting the top face and connecting the at least one radial clearance face and the at least one radial clearance face; and a long cutting edge at the intersection of the top face and the first radial clearance face, a curved cutting edge at the intersection of the top face and the first conic clearance face, and a straight cutting edge at the intersection of the top face and the first axial clearance face.

Further, a milling tool holder according to present invention comprises a shank; at least an insert-receiving pocket being built-in around the periphery of the milling tool holder and comprising a bottom seating face, a radial seating face and a peripheral seating face; at least a prismatic and cylindrical cutting insert comprising a top face; at least one radial clearance face intersecting the top face; at least one axial clearance face intersecting the top face, and at least one conic clearance face intersecting the top face and connecting the at least one radial clearance face and the at least one radial clearance face; and a long cutting edge at the intersection of the top face and the first radial clearance face, a curved cutting edge at the intersection of the top face and the first conic clearance face, and a straight cutting edge at the intersection of the top face and the first axial clearance face.

BRIEF DESCRIPTION OF THE DRAWINGS

Various features and characteristics of the non-exhaustive and non-limiting embodiments according to the present disclosure will be better understood by reference to the following figures, in which:

FIG. 4 demonstrates how a prismatic cutting insert with multiple cutting teeth is positioned on a tool holder with FIG. 4(a) for a side view and FIG. 4(b) for an enlarged view designated by the circle A in FIG. 4(a).

FIG. 11 is an embodiment of the prismatic cutting insert with four indexable cutting teeth without a facet or straight cutting edge according to present invention disclosure with FIG. 11(a) for a three-dimensional perspective view and FIG. 11(b) for a side view.

FIG. 19 shows a cylindrical cutting insert according to an embodiment of the invention with FIG. 19(a) for a three-dimensional perspective view, FIG. 19(b) for a side view, and FIG. 19(c) for a cross-sectional view taken along line C-C of FIG. 19(b).

FIG. 21 shows a cylindrical cutting insert according to another embodiment of the invention with FIG. 21(a) for a three-dimensional view, FIG. 21(b) for a side view and FIG. 21(c) as a cross-sectional view taken along line D-D of FIG. 21(b).

DETAILED DESCRIPTION OF THE INVENTION

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Parallelogram-shaped cutting inserts are typically used in peripheral rotary milling due to their relatively larger depth of cut obtained by the relatively longer cutting edge as compared to square cutting inserts. Cutting tool life becomes a critical factor in efficient peripheral long-edge rotary milling applications for machining difficult-to-machine specialty metals and fiber reinforced composite materials that are widely used in aerospace industries. Therefore, there is a need for an improved design of parallelogram-shaped cutting inserts and an associated tool holder. The innovative cutting insert presented in this invention having prismatic and cylindrical shape is the first in cutting tool industries for the category of parallelogram-shaped cutting inserts and beyond, effectively providing more available indexable positive cutting edges and economically benefiting cutting tool users with longer tool life per cutting insert.

Figure 1:
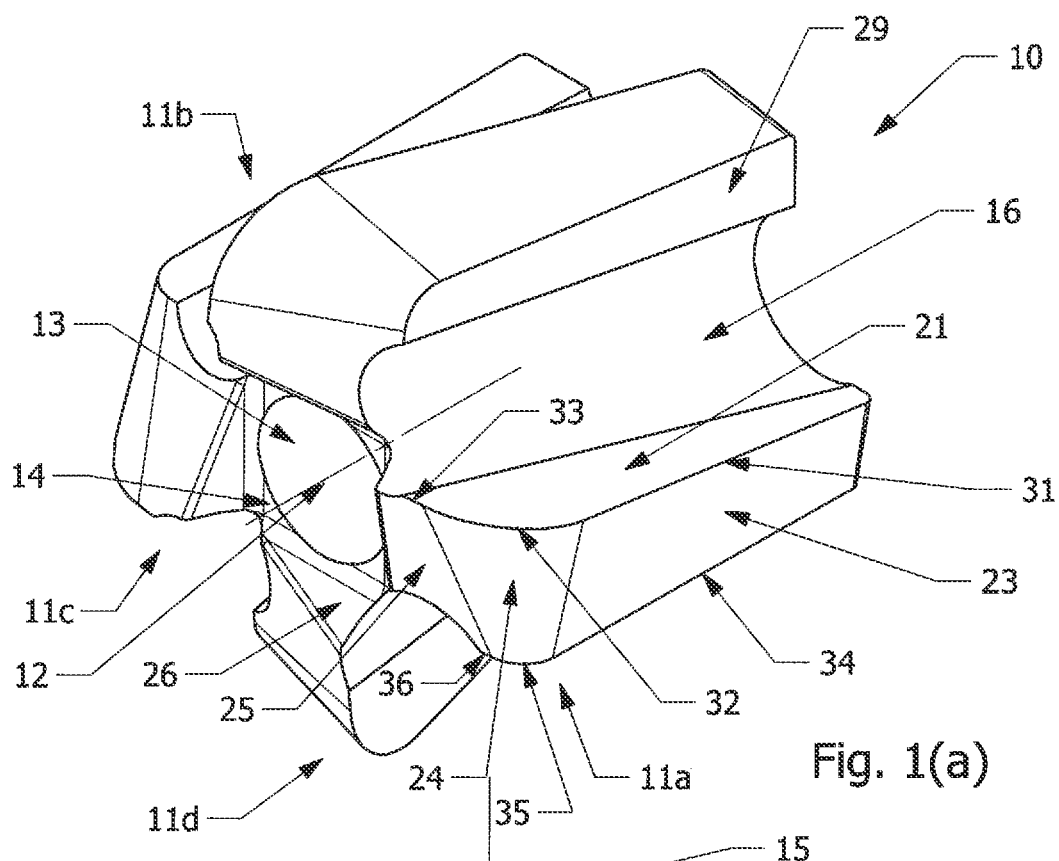
FIG. 1 is an embodiment of the prismatic cutting insert with four indexable cutting teeth according to present invention disclosure with FIG. 1(a) for a three-dimensional perspective view and FIG. 1(b) for a side view.
Figure 1:
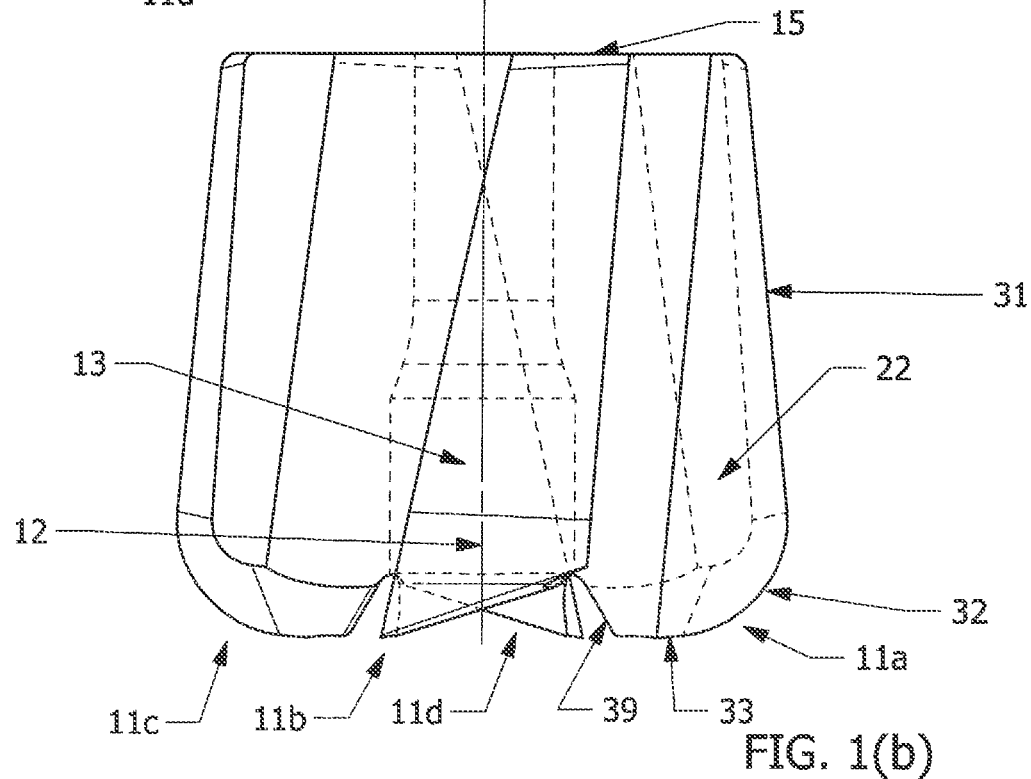

FIG. 1 is an embodiment of the prismatic cutting insert 10 with four indexable cutting teeth according to present invention disclosure with FIG. 1(a) for a three-dimensional perspective view and FIG. 1(b) for a side view. The prismatic cutting insert 10 comprising four identical positive cutting teeth 11a, 11b, 11c and 11d, each of which is equivalent to an indexable cutting edge of a traditional single-sided parallelogram-shaped cutting insert having only two indexable cutting edges. The four cutting teeth are rotational symmetric about the center axis 12 of the center screw hole 13, thus providing four available indexable cutting edges. The center screw hole 13 starts at the front end face 14 and ends at the bottom face 15 of the cutting insert 10. Each positive cutting tooth, with 11a as a representative, comprises a top face 21, a radial clearance face 23 having positive cutting geometry (i.e. positive radial cutting clearance face), a generally conical clearance face 24 having positive cutting geometry (i.e. positive cutting clearance face), an axial clearance face 25 having positive cutting geometry (i.e. positive axial cutting clearance face), a ramping clearance face 26 (on cutting tooth 11d in FIG. 1(a) due to invisible on cutting tooth 11a) and a bottom face 22 partially embraced by the edges 34, 35 and 36 (see FIG. 1(b) or FIG. 1(a) for the bottom face 22 of cutting tooth 11b). The top face 21 may be in a form of a planar surface, a planar surface with an axial rake angle and/or a radial rake angle, a chip groove or chip breaker, or a combination thereof. A complete cutting edge from a cutting tooth with 11a comprises the main long cutting edge 31, a nose corner cutting edge 32, a straight cutting edge 33 (often referred as facet edge or wiper edge), and a ramping cutting edge 39 as shown in FIG. 1(b). All the cutting clearance faces including ramping face 26, axial face 25, conical or cylindrical face 24, and radial face 23 may be in the form of multiple cutting clearance faces to provide additional clearance between the corresponding cutting edges (i.e. 39, 33, 32 and 31) and the workpiece materials to be machined. Above the top of the cutting tooth 11a is a fluted surface 16 providing a space for chip evacuation. The prismatic cutting insert 10 will seat on its bottom flat face 15 when mounted on a tool holder.

Figure 2:
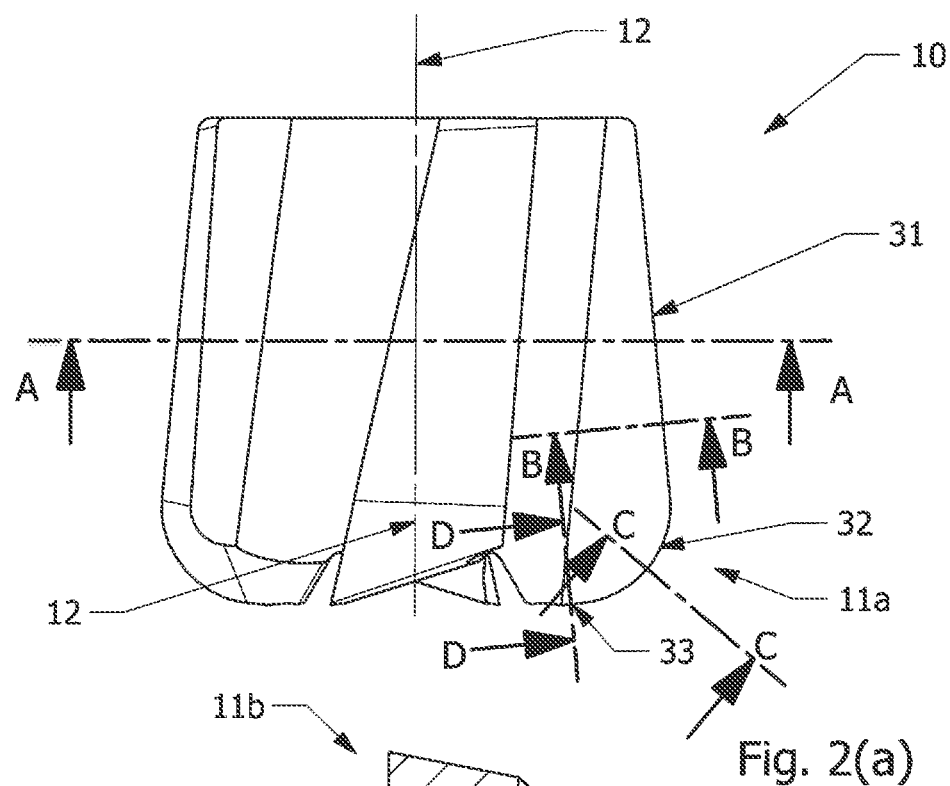
FIG. 2 various sectional views of the prismatic cutting insert in FIG. 1 with FIG. 2(a) for a side view and FIG. 2(b) for cross-section views taken along section lines A-A, B-B, C-C and D-D of FIG. 2(a).
Figure 2:
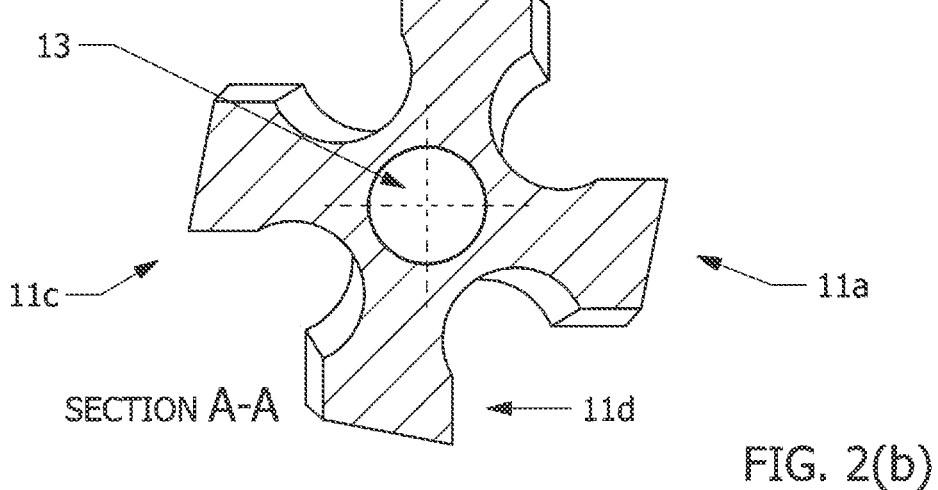
Figure 2:
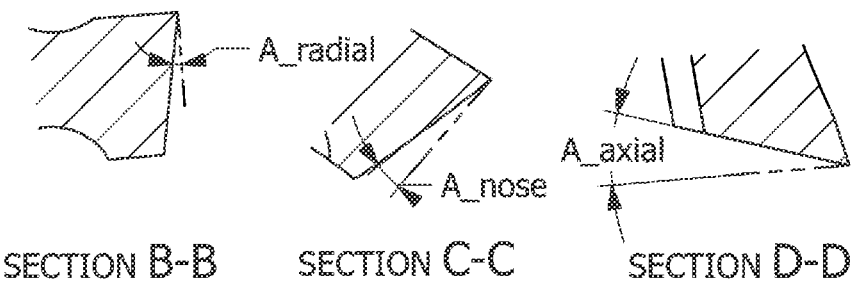

FIG. 2(a) is a side view of the prismatic cutting insert 10 (in FIG. 1) showing multiple sectional lines. Section A-A in FIG. 2(b) shows a sectioned view of all four positive cutting teeth 11a, 11b, 11c and 11d of the cutting insert 10 through the middle of the cutting insert 10 and perpendicular to the center axis of 12. Section B-B in FIG. 2(b) shows a sectioned view perpendicular to the main long cutting edge 31 of the cutting tooth 11a of the prismatic cutting insert 10, wherein the cutting edge 31 has a positive radial clearance angle A_radial. Section C-C in FIG. 2(b) shows a sectioned view approximately perpendicular to the nose corner cutting edge 32 of the cutting tooth 11a of the prismatic cutting insert 10, wherein the cutting edge 32 has a positive clearance angle A_nose. Section D-D in FIG. 2(b) shows a sectioned view perpendicular to the facet (or straight) cutting edge 33 of the cutting tooth 11a of the prismatic cutting insert 10, wherein the cutting edge 33 has a positive clearance angle A_axial in the axial direction.

Figure 3:
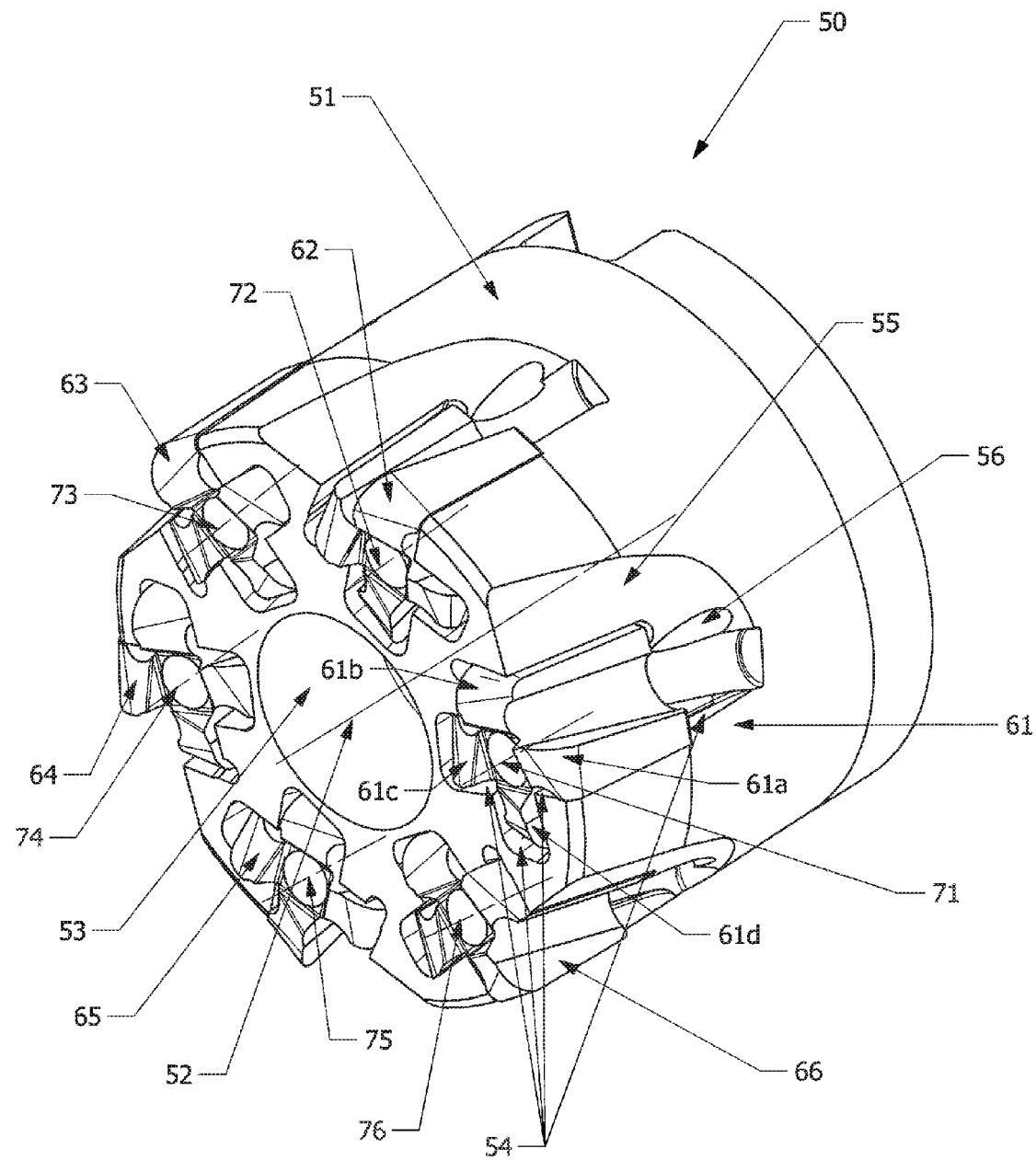
FIG. 3 is a three-dimensional perspective view of an embodiment of a cutting tool system comprising a tool holder and six prismatic cutting inserts each having four cutting teeth (or indexable cutting edges) according to present invention disclosure.

FIG. 3 is a three-dimensional perspective view of an embodiment of a cutting tool system 50 comprising a tool holder 51 and six prismatic cutting inserts 61-66 each having four indexable cutting teeth (or cutting edges) according to present invention disclosure. The tool holder 51 has a center hole 53 and a cutting axis 52 which will be perpendicular to the surface to be machined and in alignment with the rotating axis of a metal cutting machine tool. The tool holder 51 has six identical insert-receiving pockets 54 which are evenly built-in around the periphery of the tool holder 51. As a representative example, the prismatic cutting insert 61 is securely positioned in the pocket 54. At one time, only one cutting tooth (or one cutting edge) from a prismatic cutting insert is engaged in machining operation, for example the cutting tooth 61a of the prismatic cutting insert 61 is an engaging cutting tooth. The positions of the six prismatic cutting inserts 61-66 are rotationally symmetric about the cutting axis 52 of the tool holder 51. As a representative example of the prismatic cutting insert 61, four cutting teeth 61a, 61b, 61c and 61d are rotationally symmetric about the center axis 71 of the prismatic and cylindrical cutting insert 61 and each cutting tooth may be indexed about the center axis 71 to become an engaging cutting edge. Similarly each cutting tooth of prismatic cutting inserts 62-66 may be indexed about its center axis 72-76 to become an engaging cutting edge, respectively. Above each pocket like 54 are a fluted surface 55 and a coolant hole 56. The center axis 71 from a prismatic cutting insert 61 is not parallel to the cutting axis 52 of the tool holder 51.

FIG. 4 demonstrates how a prismatic cutting insert 61 (same as that in FIG. 3) with multiple positive cutting teeth 61a-61d is positioned on the tool holder 51. For demonstration purpose, only one prismatic cutting insert 61 is shown in FIG. 4(a) where the cutting insert 61 is positioned on the tool holder 51 by a tilt angle A_tilt of its center axis 71 with the cutting axis 52 of the tool holder 52. Also shown in FIG. 4(a) is a workpiece 80 to be machined and its top surface 81 is engaged with the cutting tooth 61a. FIG. 4(b) is a scale-up drawing showing details of the positions of four cutting teeth 61a, 61b, 61c and 61d when the prismatic and cylindrical cutting insert 61 is mounted on the tool holder 51 as well as the positional relation of each cutting tooth with the workpiece surface 81. The cutting tooth 61a comprises a facet edge 83, a nose corner edge 84, a long edge 85 and a ramping cutting edge 86. The tilt angle A_tilt between the cutting axis 52 of the tool holder 51 and the center axis 71 of the prismatic cutting insert 61 is determined by the following equation:

$$A\_tilt = f(A\_facet\_edge, Dis\_tool\_tip, A\_long\_edge) \quad (1)$$

where A_facet_edge is the angle between the facet edge (straight edge) 83 and the workpiece surface 81, Dis_tool_tip is the minimum distance between a tool tip (cutting tooth 61d being the case as shown in FIG. 4(b)) and the workpiece surface 81, and A_long_edge is the angle formed between the long edge 85 of the cutting tooth 61a and the workpiece top surface 81. The Dis_tool_tip determines the range of allowed ramping angle and depth in a ramping cutting operation using the ramping cutting edge 86.

Figure 5:
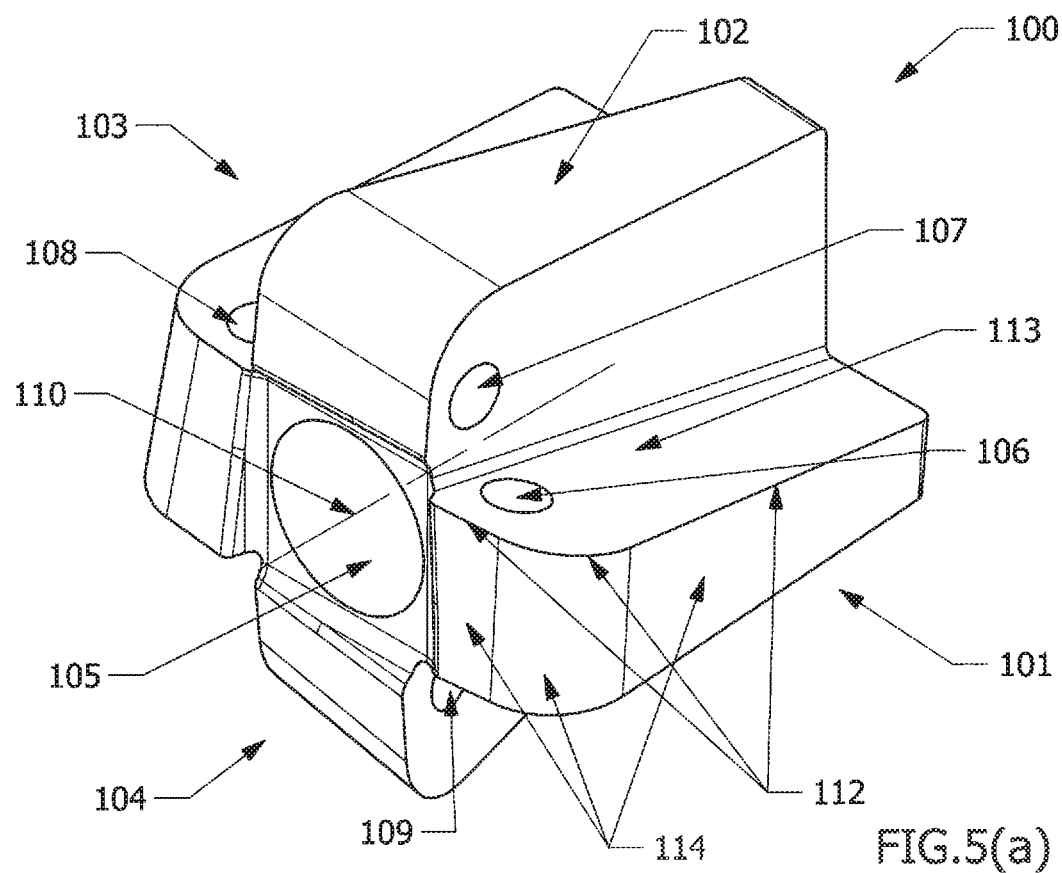
FIG. 5 is another embodiment of the prismatic cutting insert with four indexable cutting teeth each having a coolant hole on the top face according to present invention disclosure with FIG. 5(a) for a three-dimensional perspective view and FIG. 5(b) for a side view.
Figure 5:
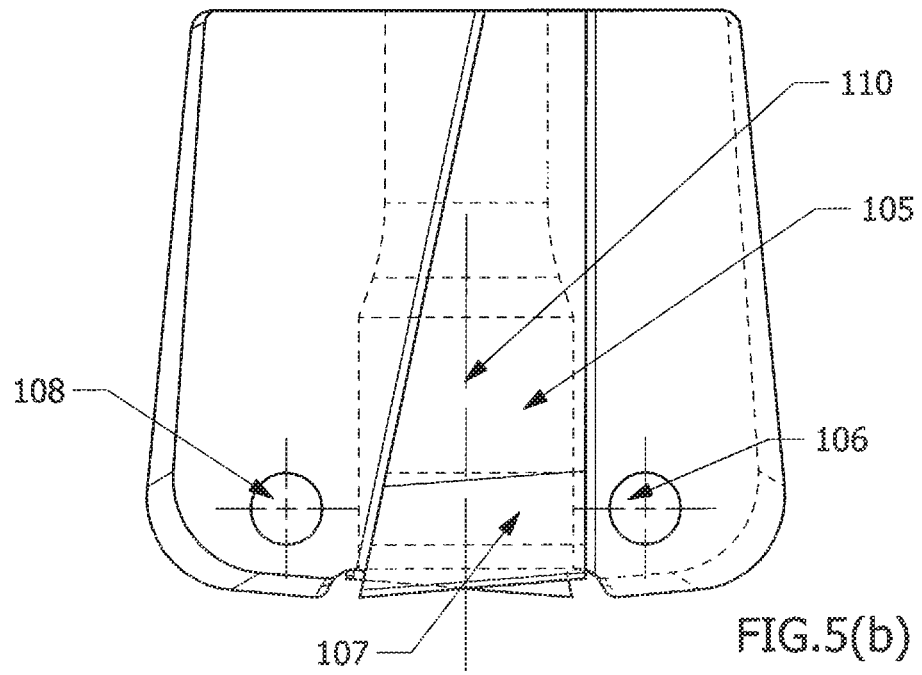

FIG. 5 is another embodiment of the prismatic cutting insert 100 with four indexable cutting teeth according to present invention disclosure with FIG. 5(a) for a three-dimensional perspective view and FIG. 5(b) for a side view. The prismatic cutting insert 100 comprising four identical positive cutting teeth 101, 102, 103 and 104, each of which is equivalent to an indexable cutting edge of a traditional single-sided parallelogram-shaped cutting insert (having only two indexable cutting edges). The four cutting teeth are rotational symmetric about the center axis 110 of the center screw hole 105, thus providing four indexable available cutting edges. Similar to the prismatic cutting insert 10 shown in FIG. 1, a complete cutting edge 112 from the cutting tooth like 101 of the prismatic cutting insert 10 typically comprises three segments as indicated in FIG. 5(a). Also similar to the prismatic cutting insert 10 shown in FIG. 1, the cutting tooth 101 of the prismatic cutting insert 100 has typically three positive clearance faces 114 as indicated in FIG. 5(a). However, a unique feature added to the prismatic cutting insert 100 (see both FIG. 5(a) and FIG. 5(b)) is the four identical through insert coolant holes 106, 107, 108 and 109 extended from the top face of the corresponding cutting tooth, for example the coolant hole 106 on the top face 113 of the cutting tooth 101. Assuming the cutting edge 112 of the cutting insert 100 is an engaging cutting edge, the coolant will come out from the coolant hole 107 from the cutting tooth 102, thus providing a more effective coolant targeting at the front portion of cutting edge 112. There may be more than one group of such through cutting insert coolant holes 106-109 on a prismatic cutting insert like the cutting insert 100.

Figure 6:
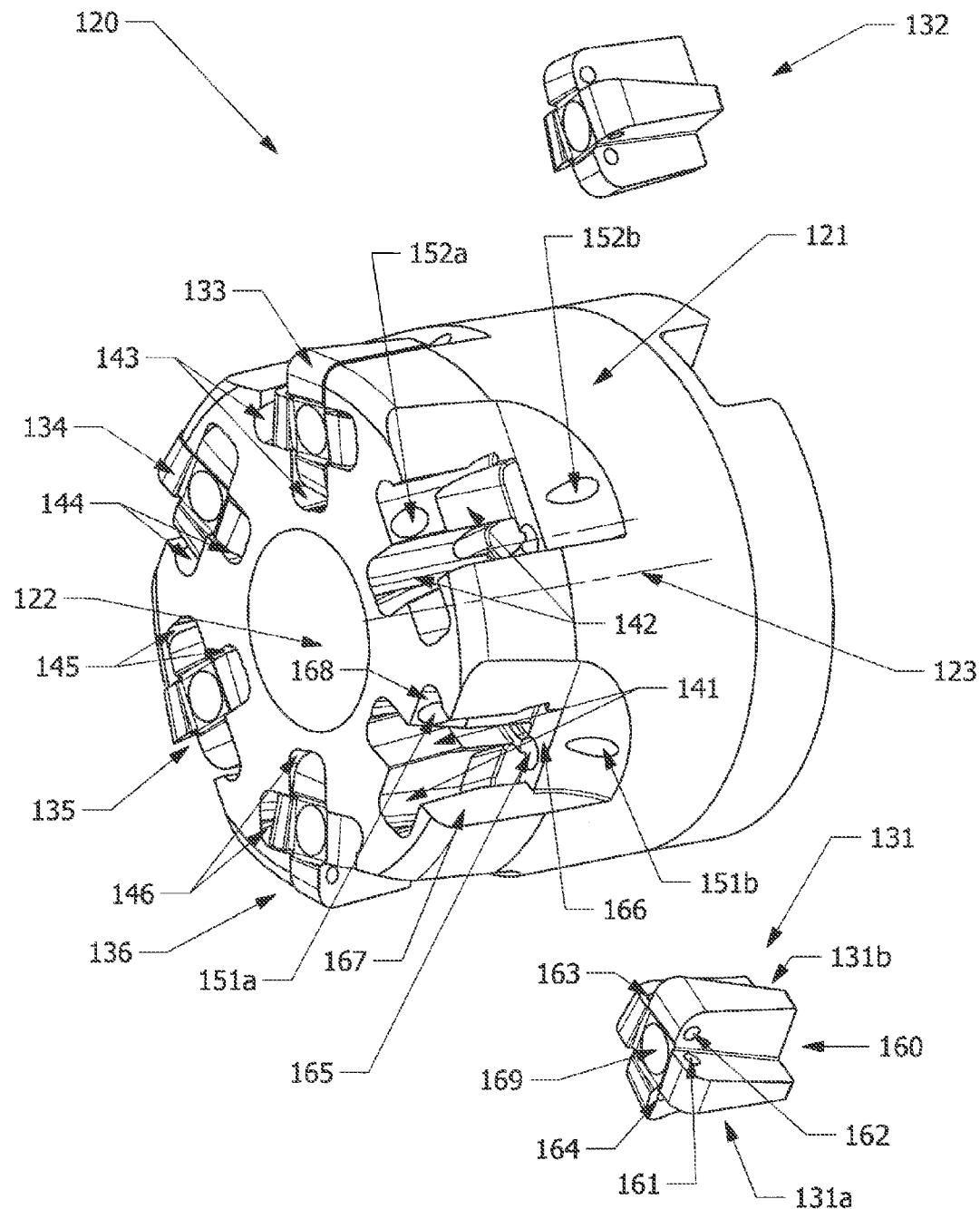
FIG. 6 is a three-dimensional perspective view of an embodiment of a cutting tool system comprising a tool holder and six prismatic cutting inserts each having four cutting teeth (or indexable cutting edges) according to present invention disclosure.

FIG. 6 is a three-dimensional perspective view of an embodiment of a cutting tool system 120 comprising a tool holder 121 and six prismatic cutting inserts 131-136 each having four cutting teeth (or indexable cutting edges) according to present invention disclosure. The tool holder 121 has a center hole 122 and a cutting axis 123 which will be perpendicular to the workpiece surface to be machined and in alignment with the rotating axis of a metal cutting machine tool. The tool holder 121 has six identical insert-receiving pockets 141-146 where the prismatic cutting inserts 131-136 are mounted. For the purpose of easy clarification of the geometric construction of the pockets 141-146 built in the tool holder 121, two prismatic cutting inserts 131 and 132 are taken aside from their positions on the tool holder 121 respectively. Similar to the prismatic cutting insert 100 shown in FIG. 5, each cutting insert 131-136 has a group of through cutting insert coolant holes, for example the four through cutting insert coolant holes 161-164 on the cutting insert 131. As shown in FIG. 6, the pocket 141 in which the prismatic cutting insert 131 will be secured has a coolant outlet 151a on the pocket face 168 for through cutting insert coolant and an additional conventional coolant outlet 151b. Similarly, the pocket 142, in which the prismatic cutting insert 132 will be secured, also has a coolant outlet 152a on the pocket face 168 for through insert coolant and an additional conventional coolant outlet 152b. Further, the prismatic cutting insert 131 will be secured in the pocket 141 by a screw (not shown) through the center hole 169 into the threaded hole 165 in the pocket 141. The bottom face 160 of the prismatic cutting insert 131 will seat on the bottom seating face 166 in the pocket 141. In addition, the top face (not shown) of the cutting tooth 131b of the prismatic cutting insert 131 will be aligned with and seated on the radial seating face 168 in the pocket 141 and the bottom face (not shown) of the cutting tooth 131a of the prismatic cutting insert 131 will be aligned with and seated on the peripheral seating face 167 in the pocket 141.

Figure 7:
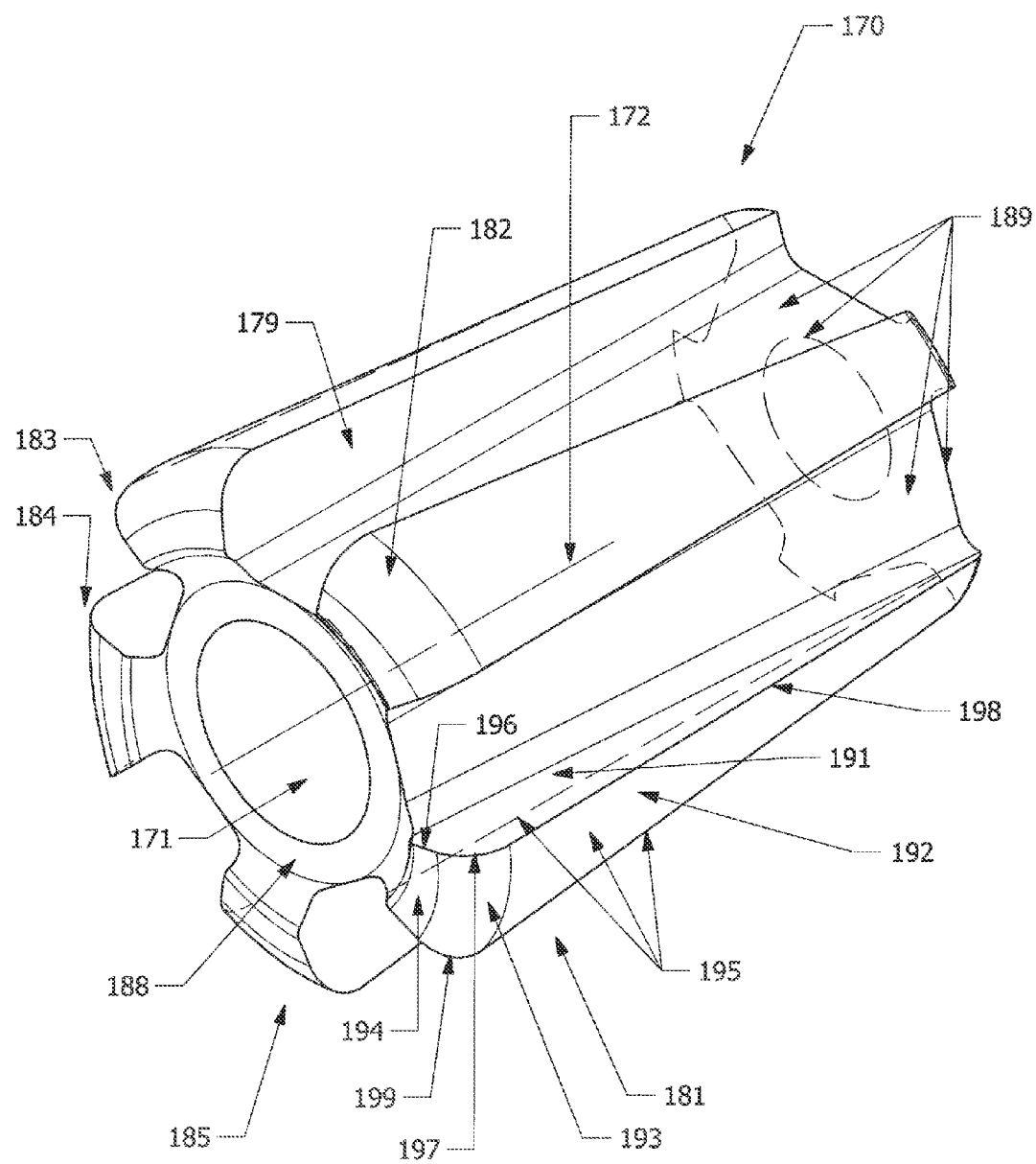
FIG. 7 is further another embodiment of the cylindrical cutting insert with five indexable cutting teeth according to present invention disclosure.

FIG. 7 is further another embodiment of the cylindrical cutting insert 170 with five indexable cutting teeth according to present invention disclosure. The prismatic cutting insert 170 comprising five identical positive cutting teeth 181, 182, 183, 184 and 185, each of which is equivalent to an indexable cutting edge of a traditional single-sided parallelogram-shaped cutting insert with only two indexable cutting edges. The five cutting teeth are rotational symmetric about the center axis 172 of the center screw hole 171 which is extended from the front face 188 to the bottom face 189, thus providing five indexable available cutting edges. The bottom face 189 of the cutting insert 170 is usually a flat face functioning as a seating face when be seated in a corresponding insert-receiving pocket on a tool holder. The cutting insert 171 has a generally cylindrical (including conical) shape with each cutting tooth has a complete or partial cylindrical (conical) radial clearance surface, for instance, the cutting tooth 181 of the cylindrical cutting insert 170 has a cylindrical (conical) surface 192. In addition, the cutting tooth 181 has a top face 191, a bottom face 195, an axial clearance face 194, and a nose corner clearance face 193. Each cutting tooth provides a complete cutting edge, for instance, the cutting tooth 181 of the cylindrical cutting insert 170 has a main cutting edge comprising a long cutting edge 198, a nose corner curved cutting edge 197, and a facet (or straight) cutting edge 196. The nose corner clearance face 193 is generally conical which is defined in this invention to include a non-tapered cylindrical face as a special case when the radius of the nose corner curved cutting edge 197 at the top face 191 is equal to that of the nose corner edge 199 at the bottom face 195.

There is no upper limit of the number of cutting teeth for a prismatic cutting insert 10 shown in FIG. 1, the prismatic cutting insert 100 illustrated in FIG. 5, and the cylindrical cutting insert 170 presented in FIG. 7. It all depends how much space needed between the cutting teeth in order to evacuate chips generated when machining a particular category of work materials. Specifically speaking, when machining the work materials that generate long chips like a kind of difficult-to-machine material, it may require fewer number of cutting teeth for example three to five, however, when machining the work materials that generate segmented chips like a kind of cast iron and alloy, medium to high carbon steel or fiber reinforced composite, it may be of great advantage to develop a prismatic or cylindrical cutting insert with more cutting teeth like five, six and even more.

Figure 8:
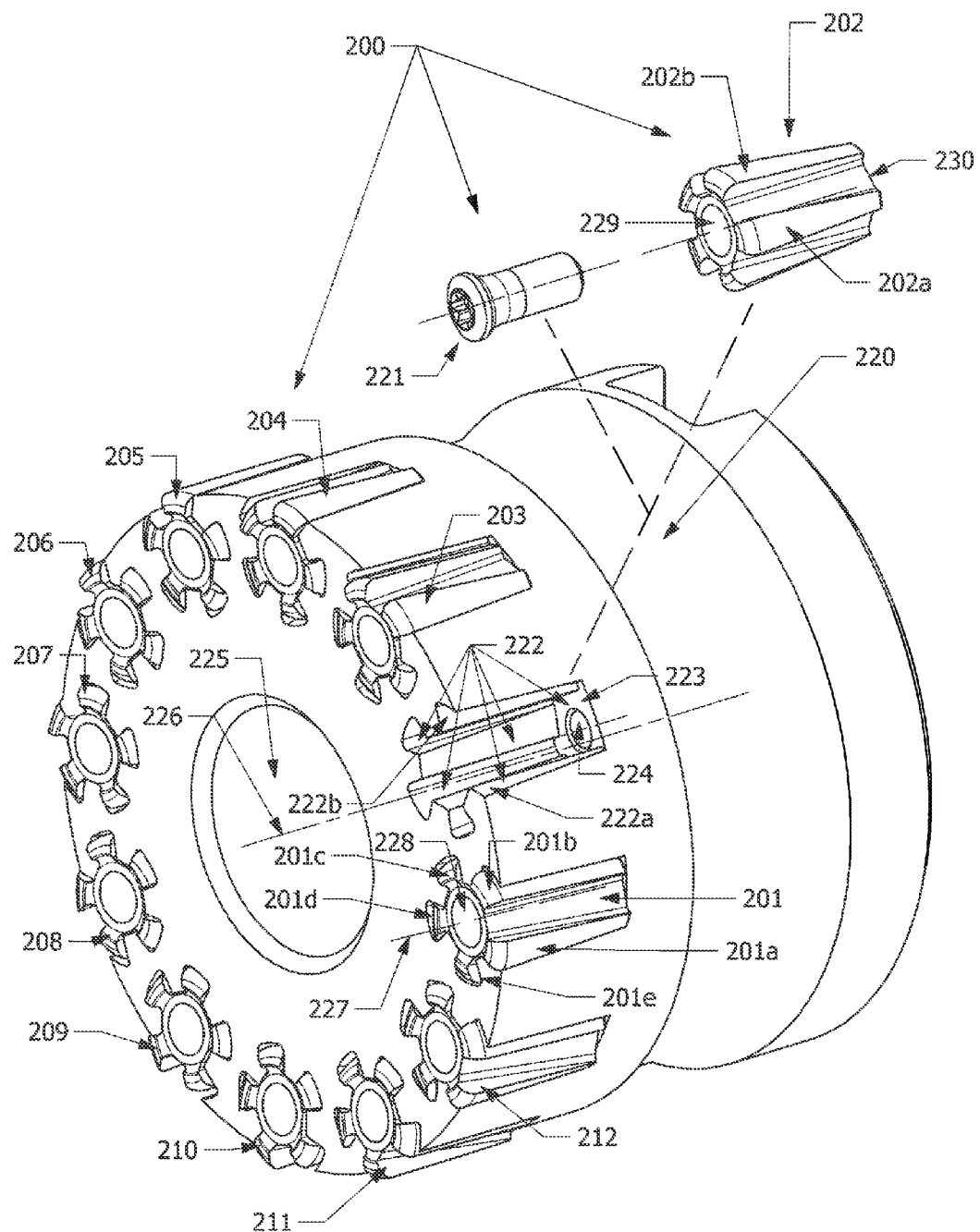
FIG. 8 is a three-dimensional perspective view of another embodiment of a cutting tool system comprising a tool holder, twelve cylindrical cutting, and twelve fastening screws.

Another unique feature of a prismatic and cylindrical cutting insert is that the insert may be designed into a compact size with more indexable cutting edges for the applications of machining materials featured by segmented or small chips. FIG. 8 is a three-dimensional perspective view of another embodiment of a cutting tool system 200 comprising a tool holder 220, twelve cylindrical cutting inserts 201-212 similar to the cylindrical cutting insert 170 shown in FIG. 7, and twelve fastening screws (only screw 221 is shown). Each of the cutting inserts 201-212 has five cutting teeth (or indexable cutting edges) according to present invention disclosure. As a representative example, the cylindrical cutting insert 201 in FIG. 8 has five cutting teeth (or indexable cutting edges) 201a, 201b, 201c, 201d, and 201e each of which is indexable about the axis 227 of the center hole 228. The tool holder 220 has a center hole 225 and a cutting axis 226 which will be perpendicular to the workpiece surface to be machined and in alignment with the rotating axis of a metal cutting machine tool. The tool holder 220 has twelve identical insert-receiving pockets (only pocket 222 is shown) where the prismatic cutting inserts 201-212 are mounted and secured by a corresponding screw like screw 221. An exploded view of the screw 221 and the cylindrical cutting insert 202 being moved up from their original positions in the pocket 222 is created in FIG. 8 where the screw 221 will secure the cylindrical cutting insert 202 through the center hole 229 into the threaded hole 224 in the pocket 222 of the tool holder 220. The bottom face 230 of the cylindrical cutting insert 202 will be seated against the bottom seating face 223 in the pocket 222. In addition, the top face (not shown) of the cutting tooth 202b of the cylindrical cutting insert 202 will be aligned with and seated on the radial seating face 222b in the pocket 222 and the bottom face (not shown) of the cutting tooth 202a of the cylindrical cutting insert 202 will be aligned with and seated on the peripheral seating face 222a in the pocket 222 on the tool holder 220.

Figure 9:
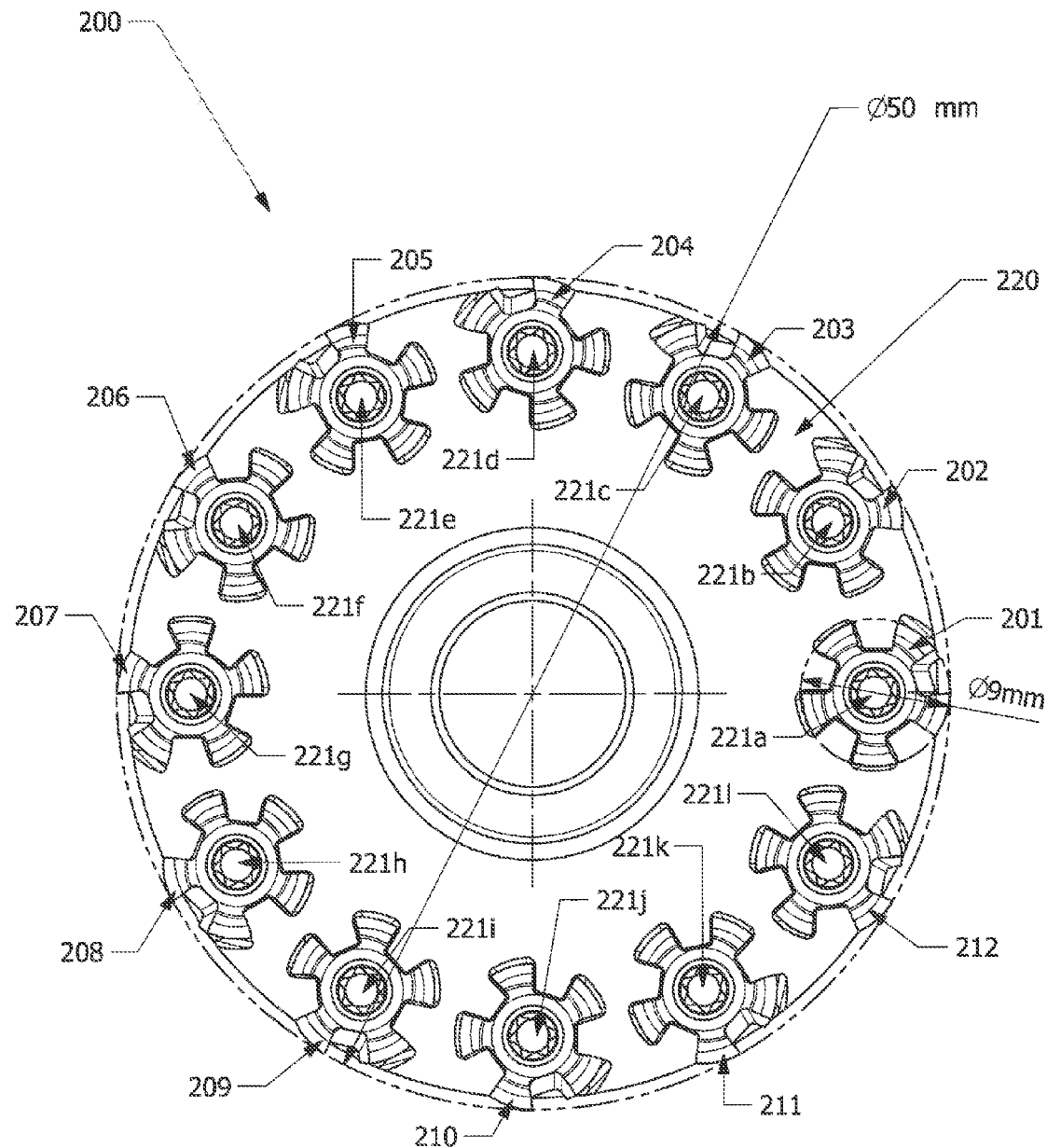
FIG. 9 is a practical design example showing the front-end view of a cutting tool system comprising a tool holder, twelve cylindrical cutting inserts, and twelve screws.

Also, much more flutes can be created on the tool holder having prismatic or cylindrical cutting inserts as compared with conventional parallelogram cutting inserts either single-sided cutting insert with positive geometric shape or double-sided cutting insert with negative geometric shape. This is largely due to the general cylinder profile of a prismatic and/or cylindrical cutting insert and the position and orientation of the prismatic or cylindrical cutting insert on the tool holder. As a practical design example shown in FIG. 9 for a front-end view of the cutting tool system 200 (as seen in FIG. 8) comprising a tool holder 220, twelve cylindrical cutting inserts 201-212, and twelve screws 221*a*-221*l*. As shown in FIG. 9 for a cutting diameter of only 50 mm, the tool holder can hold twelve cylindrical cutting inserts having an IC (inscribed circle) of 9 mm. This, in addition to more indexable cutting edges, may provide a significantly increased productivity in terms of material removal rate per cutting tool in machining operations that need a long cutting edge from a parallelogram cutting insert.

Figure 10:
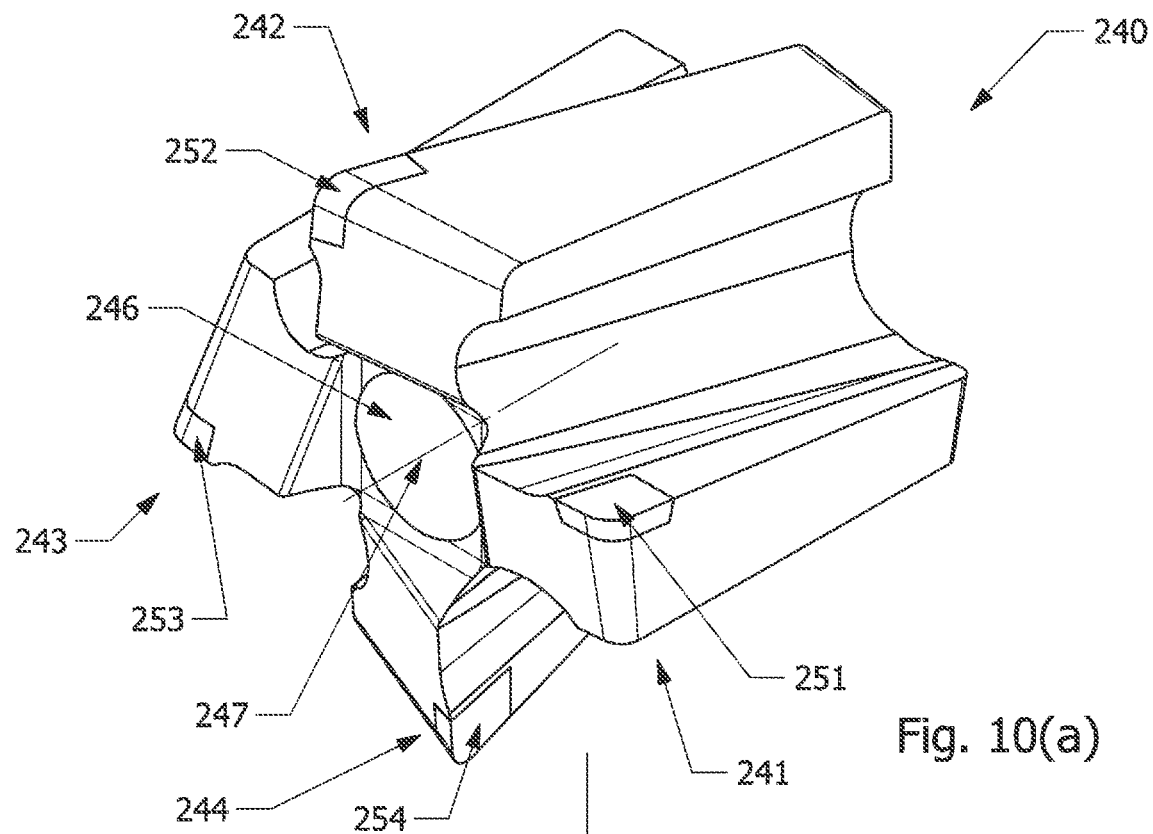
FIG. 10 is further another embodiment of the prismatic cutting insert with four indexable cutting teeth each having a built-in hard tool tip according to present invention disclosure with FIG. 10(a) for a three-dimensional perspective view and FIG. 10(b) for a side view.
Figure 10:
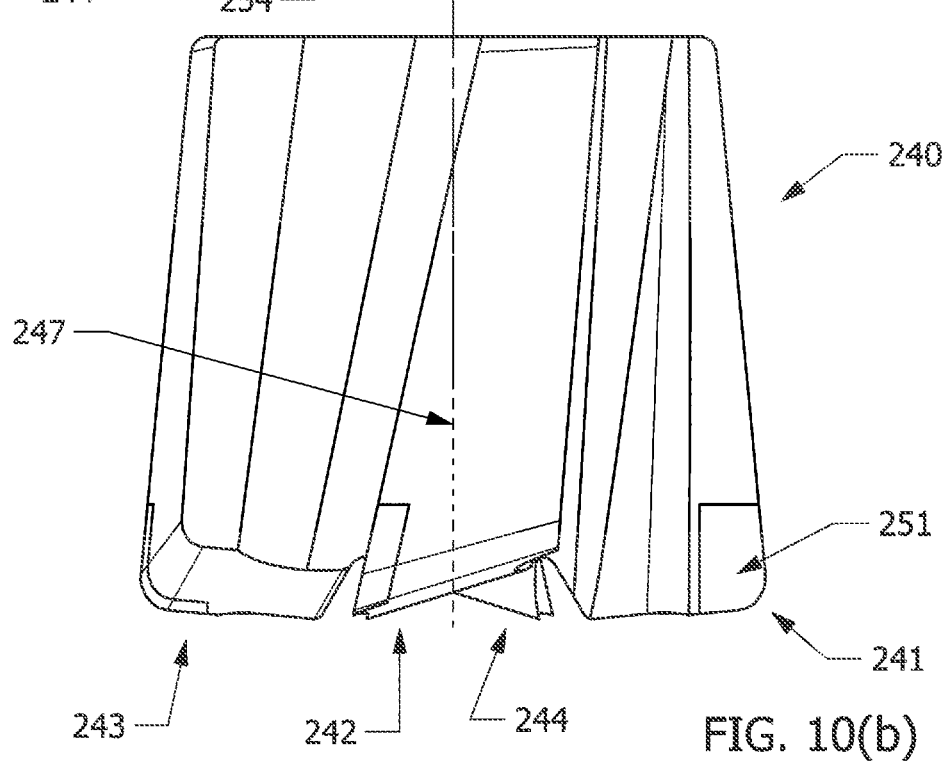

FIG. 10 is further another embodiment of the prismatic cutting insert 240 with four indexable positive cutting teeth according to present invention disclosure with FIG. 10(*a*) for a three-dimensional perspective view and FIG. 10(*b*) for a side view. The prismatic cutting insert 240 comprising four identical positive cutting teeth 241, 242, 243 and 244 each of which has a hard tool bit 251-254 built onto the cutting tooth. The material of such a hard tool bit 251-254 may be PCD (Polycrystalline diamond), CBN (Cubic boron nitride), etc. The four cutting teeth 241-244 are rotational symmetric about the center axis 247 of the center screw hole 246, thus providing four indexable available cutting edges. Such a prismatic cutting insert 240 with a built-in PCD or CBN tool tip may be particularly applicable to the applications of composite machining involving fiber reinforced composite material or carbon fiber reinforced polymer widely used in aerospace industries.

FIG. 11 is an embodiment of the prismatic cutting insert with four indexable cutting teeth according to present invention disclosure with FIG. 11(*a*) for a three-dimensional perspective view and FIG. 11(*b*) for a side view. The prismatic cutting insert 300 comprising four identical positive cutting teeth 301*a*, 301*b*, 301*c* and 301*d*, each being equivalent to an indexable cutting edge of a traditional single-sided parallelogram-shaped cutting insert having two indexable cutting edges. The four cutting teeth 301*a*-301*d* are rotational symmetric about the center axis 309 of the center screw hole 308, thus providing four available indexable cutting edges. Each cutting tooth, with 301*a* as a representative, comprises a top face 302, a radial face 303 having positive cutting geometry (i.e. positive radial cutting clearance face), a conical or cylindrical face 304 having positive geometry (i.e. positive conical cutting clearance face), an axial face 305 having positive geometry (i.e. positive axial cutting clearance face), and a bottom face 314 (see dotted area in FIG. 11(*b*) or FIG. 11(*a*) for the bottom face 306 of the cutting tooth 301*b*). The top face 302 may be in a form of a planar surface, a planar surface with an axial rake angle and a radial rake angle, a chip groove or chip breaker, or a combined geometry of all the above-described. A complete cutting edge from a cutting tooth 301*a* comprises a main long cutting edge 311 and a nose corner edge 312. As a difference from the prismatic cutting insert 10 in FIG. 1, the prismatic cutting insert 300 lacks a facet or straight cutting edge. Above the top of the cutting tooth 301*a* is a fluted surface 316 providing a space for chip evacuation.

Certain non-limiting embodiments according to the present disclosure include a generally prismatic and cylindrical including tapered or conical parallelogram cutting insert having multiple identical cutting teeth each comprising a top face; at least one radial clearance face intersecting the top face; at least one axial clearance face intersecting the top face, and at least one conic or cylindrical clearance face intersecting the top face and connecting the at least one radial clearance face and the at least one axial clearance face; and a main cutting edge at the intersection of the top face and the first radial clearance face, a curved cutting edge at the intersection of the top face and first conic clearance face, and a straight cutting edge at the intersection of the top face and the first axial clearance face. The straight cutting edge is often referred as facet or wiper edge that is perpendicular to the cutting axis of the associated tool holder where multiple parallelogram cutting inserts are mounted.

The term "prismatic" used in this invention disclosure is mainly based on the theoretical description of "prism" which is defined in geometry as a polyhedron with n-sided polygonal base. Also in theory a polyhedron is defined as a solid in three dimensions with planar faces and straight edges and in cutting tool industries, such a definition may be tailored to effectively describe the geometric features of a cutting tool by adding geometric attributes like curved edges, blended corners, grooved surfaces, etc. The term "prismatic" is used to describe the multiple identical cutting teeth symmetrically built around a center axis of the prismatic cutting insert. The term "cylindrical" used in this invention disclosure mainly means that the (outward) radial clearance surface of each cutting tooth from a cylindrical cutting insert is a tapered cylindrical or conical surface at the periphery. The concept of using unique prismatic and cylindrical cutting inserts to provide positive cutting edge or positive cutting geometry for milling operations according to this invention is the first in cutting tool industries as compared with the conventional cutting inserts and tangential cutting inserts, which are two major categories of milling cutting inserts. Some embodiments according to the present invention disclosure may have a combined shape of prismatic profile and cylindrical profile, each of which has been described in details through FIGS. 1-11. In order to further clarify what a prismatic and cylindrical cutting insert is and why the term prismatic and cylindrical is used, FIGS. 12-17 demonstrate step by step the creation of a basic prismatic and cylindrical cutting insert.

Figure 12:
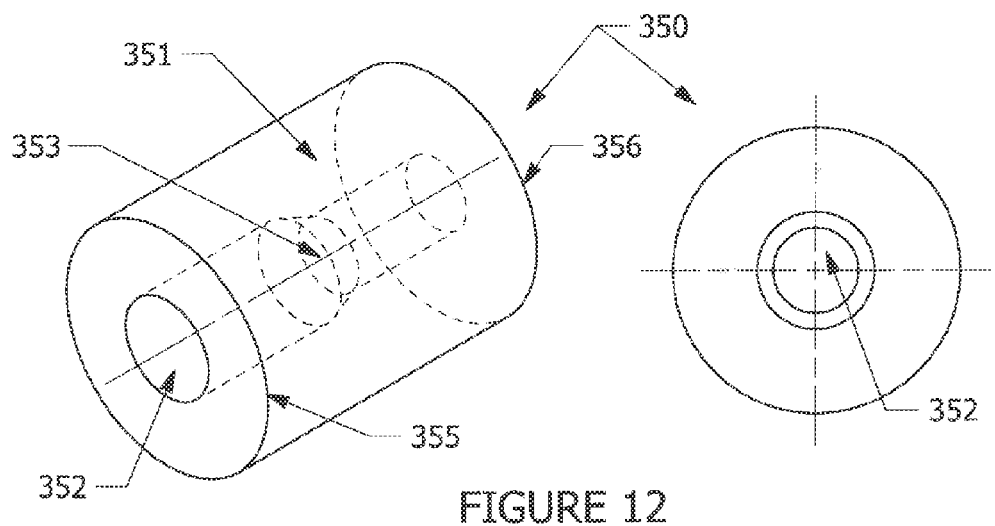
FIG. 12 shows a three-dimensional perspective view and a front-end view of a basic cylinder having a center axis and a center hole.

As Step One a cylinder 350 is shown in FIG. 12 where the left side view is a three-dimensional perspective view and the right side view is a front-end view. The cylinder 350 has a center axis 353, a center hole 352 and a cylindrical surface 351 starting from front periphery 355 and ending at back periphery 356 which is equal in diameter to the front periphery 355.

Figure 13:
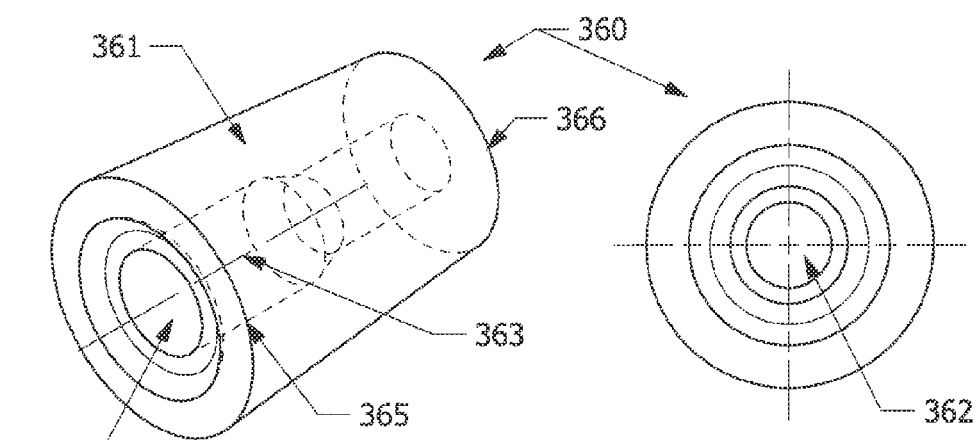
FIG. 13 shows a three-dimensional perspective view and a front-end view of a basic tapered cylinder having a center axis and a center hole.

As Step Two the cylinder 350 in FIG. 12 is geometrically transformed into a tapered cylindrical shape or a conical shape 360 as shown in FIG. 13 where the left side view is a three-dimensional perspective view and the right side view is a front-end view. The tapered (or conical) cylinder 360 has a center axis 363, a center hole 362 and a conical surface 361 starting from front periphery 365 and ending at back periphery 366 which is smaller in diameter than the front periphery 365.

Figure 14:
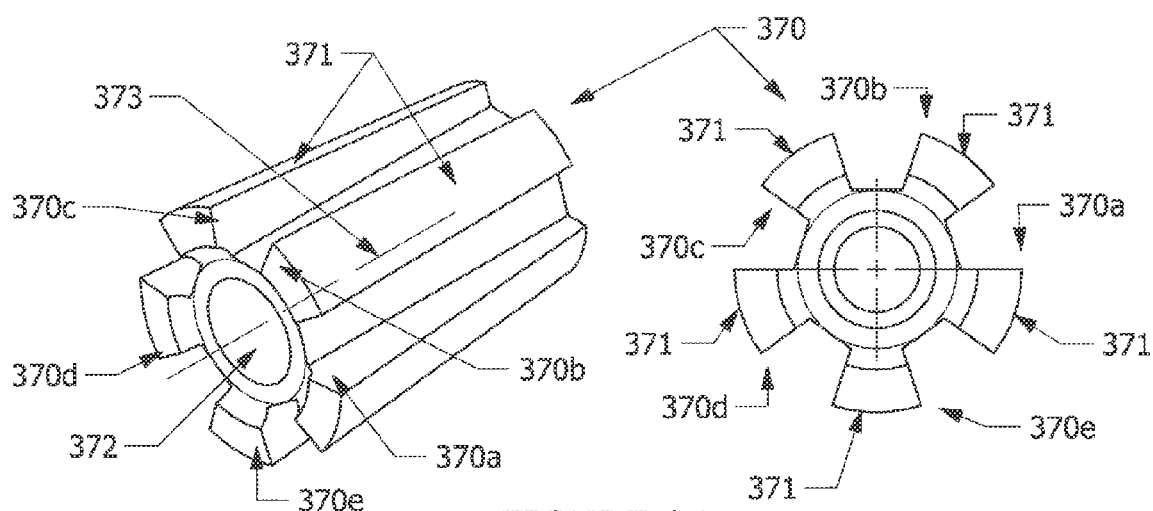
FIG. 14 shows a three-dimensional perspective view and a front-end view of a basic cylindrical cutting insert having cylindrical (or conical) peripheral profile.

As Step Three the tapered cylinder 360 in FIG. 13 is further geometrically transformed into a cylindrical cutting insert 370 shown in FIG. 14 having a tapered cylindrical (or conical) peripheral profile 371. The cylindrical cutting insert 370 has a center hole 372, a center axis 373, and five identical cutting teeth (or indexable cutting edges) 370*a*, 370*b*, 370*c*, 370*d* and 370*e*. As shown in both the left and right side views in FIG. 14, each cutting tooth 370*a*-370*e* of the cylindrical cutting insert 370 has the same tapered cylindrical (or conical) peripheral profile 371.

Figure 15:
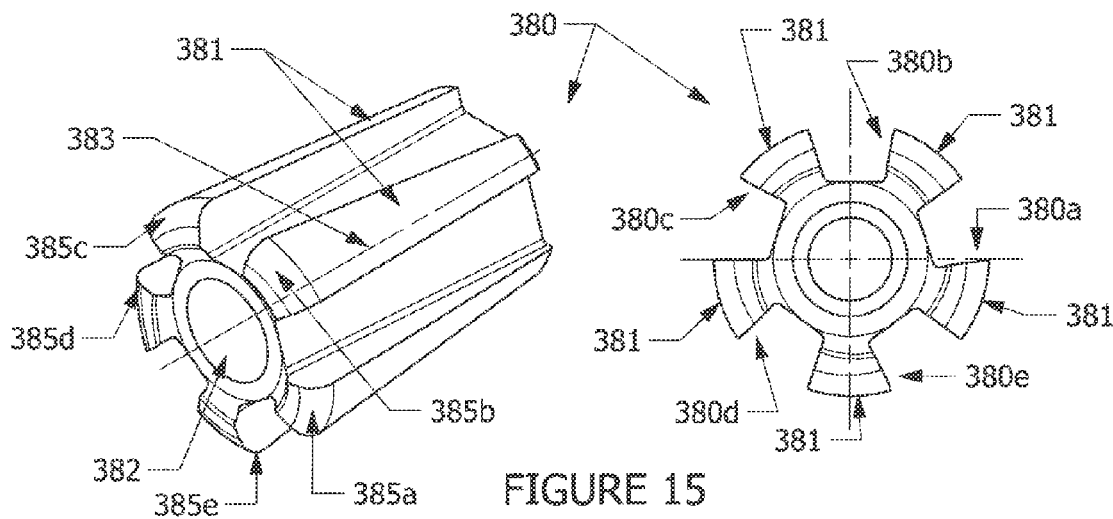
FIG. 15 shows a three-dimensional perspective view and a front-end view of a basic cylindrical cutting insert having cylindrical (or conical) peripheral profile and blended nose corners.

As Step Four the cylindrical cutting insert 370 in FIG. 14 is further geometrically transformed into a more reality cylindrical cutting insert 380 shown in FIG. 15 by adding a blended nose corner 385*a*-385*e* for each corresponding cutting tooth 380*a*-380*e*. The cylindrical cutting insert 380 has a center hole 382, a center axis 383, and five identical cutting teeth (or indexable cutting edges) 380*a*, 380*b*, 380*c*, 380*d* and 380*e* each having the same tapered cylindrical (or conical) peripheral profile 381 as shown in both the left and right side views of FIG. 15.

Figure 16:
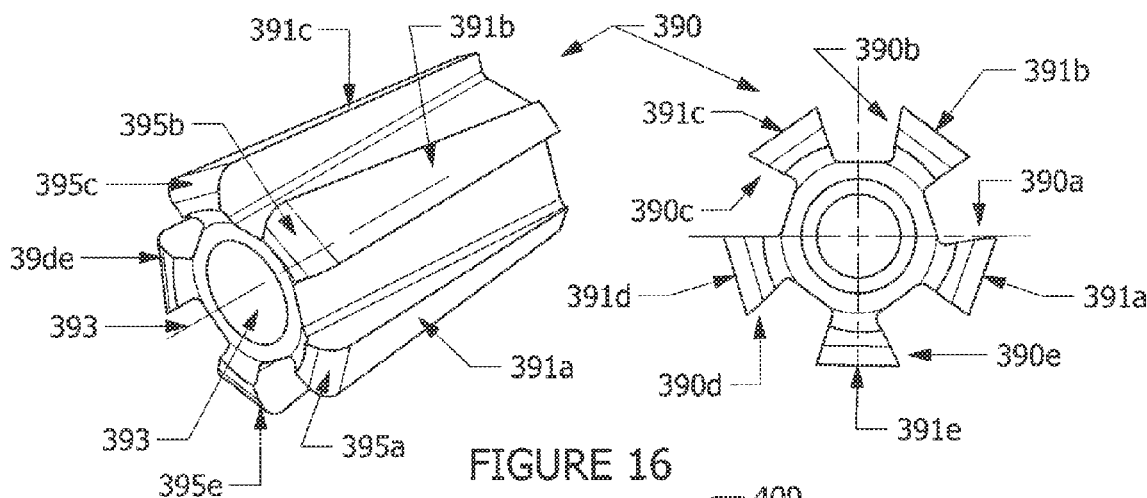
FIG. 16 shows a three-dimensional perspective view and a front-end view of a basic prismatic cutting insert having prismatic peripheral planar surface and blended nose corners.

As an alternative Step Four the cylindrical cutting insert 370 in FIG. 14 may be geometrically transformed into prismatic cutting insert 390 shown in FIG. 16 by adding a blended nose corner 395a-395e for each cutting tooth 390a-390e. The prismatic cutting insert 390 has a center hole 392, a center axis 393, and five identical cutting teeth (or indexable cutting edges) 390a, 390b, 390c, 390d and 390e each having the same prismatic planar surface 391a-391e and with no original cylindrical peripheral profile as shown in both the left and right side views of FIG. 16.

Figure 17:
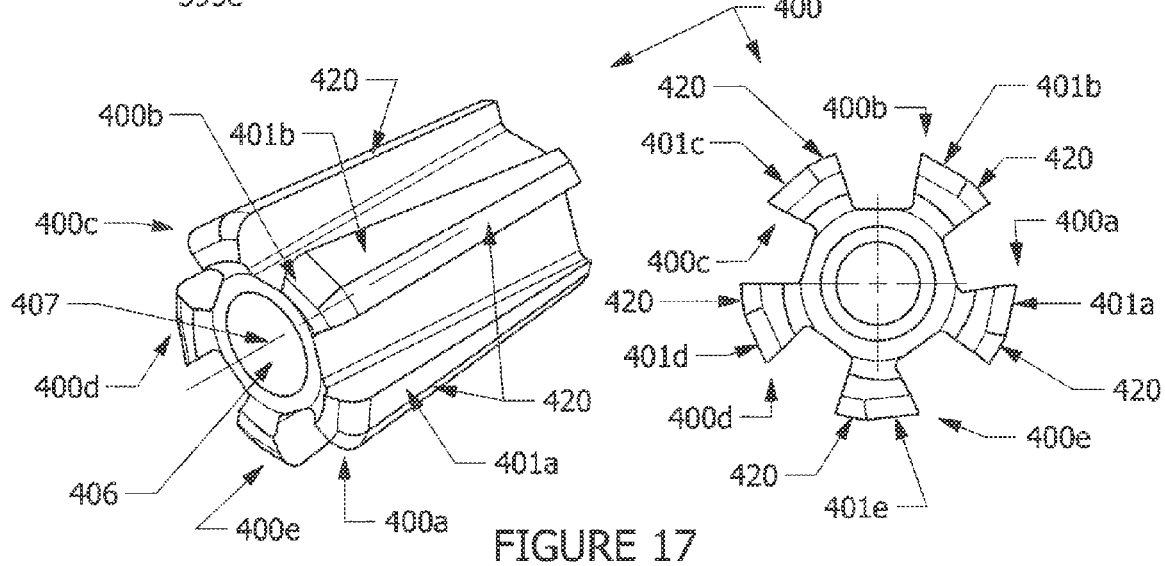
FIG. 17 shows a three-dimensional perspective view and a front-end view of a basic prismatic and cylindrical cutting insert having combined prismatic peripheral planar surface and cylindrical (or conical) peripheral profile.

As an optional Step Five the cylindrical cutting insert 370 in FIG. 14 may be further geometrically transformed into a prismatic and cylindrical cutting insert 400 shown in FIG. 17 by adding a blended nose corner (not numbered) for each cutting tooth 400a, 400b, 400c, 400d and 400e. The prismatic and cylindrical cutting insert 400 has a center hole 406, a center axis 407, and five identical cutting teeth (or indexable cutting edges) 400a-400e each having the same prismatic planar surface 401a-401e together with an original cylindrical (tapered or conical) peripheral profile 420 as shown in both the left and right side views of FIG. 17. Therefore we define the cutting insert created according FIGS. 12-17 as a prismatic and cylindrical cutting insert.

In particular, the concept of cylindrical cutting insert having a plurality of long cutting edges comes from a simple idea, that is, convert an solid endmill having multiple flutes into a parallelogram cutting insert comprising long cutting edge. Each cutting tooth from a solid endmill can be converted into a positive cutting tooth mimicking a single-sided parallelogram cutting insert (referred as A-style cutting insert in cutting tool industries). Thus each cutting tooth of a cylindrical cutting insert possesses all geometric features of single-sided parallelogram cutting insert such as long cutting edge, 90 degree shoulder cutting, ramping capability, chip groove, a wide range of nose corner radii and all around positive cutting clearance surfaces, however, the number of indexable cutting edges may be increased to, for example, three, four, five and even more, as compared only two for a commercially available single-sided parallelogram cutting insert.

Furthermore, a cylindrical cutting insert has advantages over a prismatic cutting insert as presented earlier in FIGS. 1-6 from the view point of the simplicity in cutting insert manufacturing. The cylindrical periphery of a cylindrical cutting insert is easier to achieve better dimensional accuracy and consistent indexability due to the fact that all indexable cutting edges share the same circular periphery.

Figure 18:
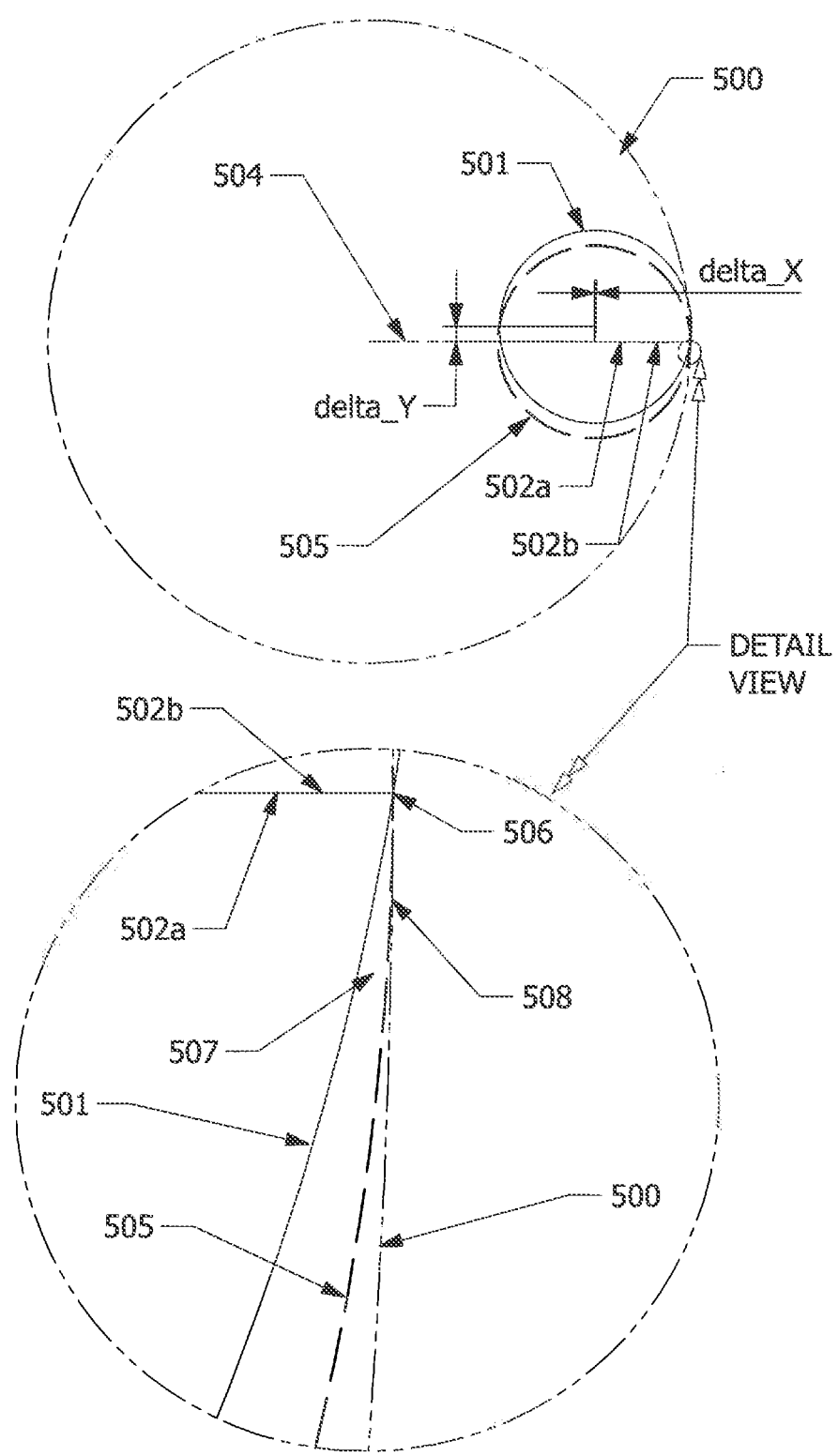
FIG. 18 is a principle diagram showing a cylindrical cutting insert.

In the following FIGS. 18 to 20, a detailed description is provided to present an embodiment based on this invention for a cylindrical cutting insert which demonstrates all geometric features that a commercially available single-sided parallelogram cutting insert possesses. FIG. 18 is a principle diagram showing that a cylindrical cutting insert represented by a small broken line circle 505 is positioned in a cutter body represented by the big arc 500 where the small circle 505 is tangent to the big arc 500 and the center line 502a representing a cutting edge is aligned to the center line 504 of the big arc 500. As a comparison, the small solid line circle 501 represented another cylindrical cutting insert is linearly offset by delta_X and delta_Y from the circle 505 while maintaining its cutting edge 502b at the center line 504 of the arc 500. As seen from the detailed view the small circle 501 forms a sufficient positive cutting clearance 507 under the cutting point 506 against the big arc 500 while the small circle 505 forms a very limited clearance 508. A cylindrical periphery may be easier to manufacture than prismatic periphery thus may be a good candidate for fully pressed or fully injection molded cutting insert. The positional relationship of the small circle 501 is used for creating a cylindrical cutting insert comprising a plurality of positive cutting teeth presented in the following FIGS. 19-21.

FIG. 19 shows an embodiment according to this invention for a cylindrical cutting insert 510 with FIG. 19(a) for a perspective view, FIG. 19(b) for a side view and FIG. 19(c) for a sectioned view from section C-C in FIG. 19(b). The cylindrical cutting insert 510 has a generally tapered or conical profile from its front-end face 517 to the rear-end face 518. The cylindrical cutting 510 comprises four identical and indexable positive cutting teeth 511, 512, 513 and 514 which are rotational symmetric around the center axis 515 of the fastener bore 516. Each cutting tooth 511 has a top face 521, a bottom face 522 (also see the bottom face 512a from cutting tooth 512), a radial clearance face 523 which is a portion of the tapered cylindrical periphery of the cylindrical cutting insert 510, a conical clearance face 524 which may be in a form of cylindrical face in some cases, an axial clearance face 525, and a ramping clearance face 526 (also see the ramping clearance face 514a on cutting tooth 514). Further each cutting tooth 511 of the cutting insert 510 comprises a major long cutting edge 531, a curved nose cutting edge 532, a straight cutting edge 533, and a ramping cutting edge 534 (also see the ramping cutting edge 514b on cutting tooth 514). In some embodiments, the number of straight cutting edges and the number of curved cutting edges may be more than one. The top face 521 of the cutting tooth 511 comprise a chip groove or chip breaker 538 as seen in both FIG. 19(a) and FIG. 19(c), and in some embodiments of this invention, the top face 521 may be in a form of a planar surface, a planar surface with an axial rake angle and a radial rake angle, a chip groove, a chip breaker, and a geometric combination of a planar surface, or a chip groove and a chip breaker. In FIG. 19(b), the conical portion 539 of the fastener bore 516 of the cylindrical cutting insert 510 is at the middle of the cylindrical cutting insert 510 along its center axis 515 thus providing a unique solution to avoid using a long screw (not shown) in order to secure a cylindrical cutting insert 510 into a threaded hole on a tool holder. The curved nose cutting edge 532 has a wide range of nose radii of parallelogram cutting inserts that may be created by this invention. The space 529 between the top face 521 of the cutting tooth 511 and the bottom face 512a of an adjacent cutting tooth 512 automatically forms a cutting flute to evacuate chips produced during the machining, which may reduce a manufacturing operation to create a flute on the tool holder in the case that a flute from a cutting tooth alone is sufficient to evacuate chips.

Figure 20:
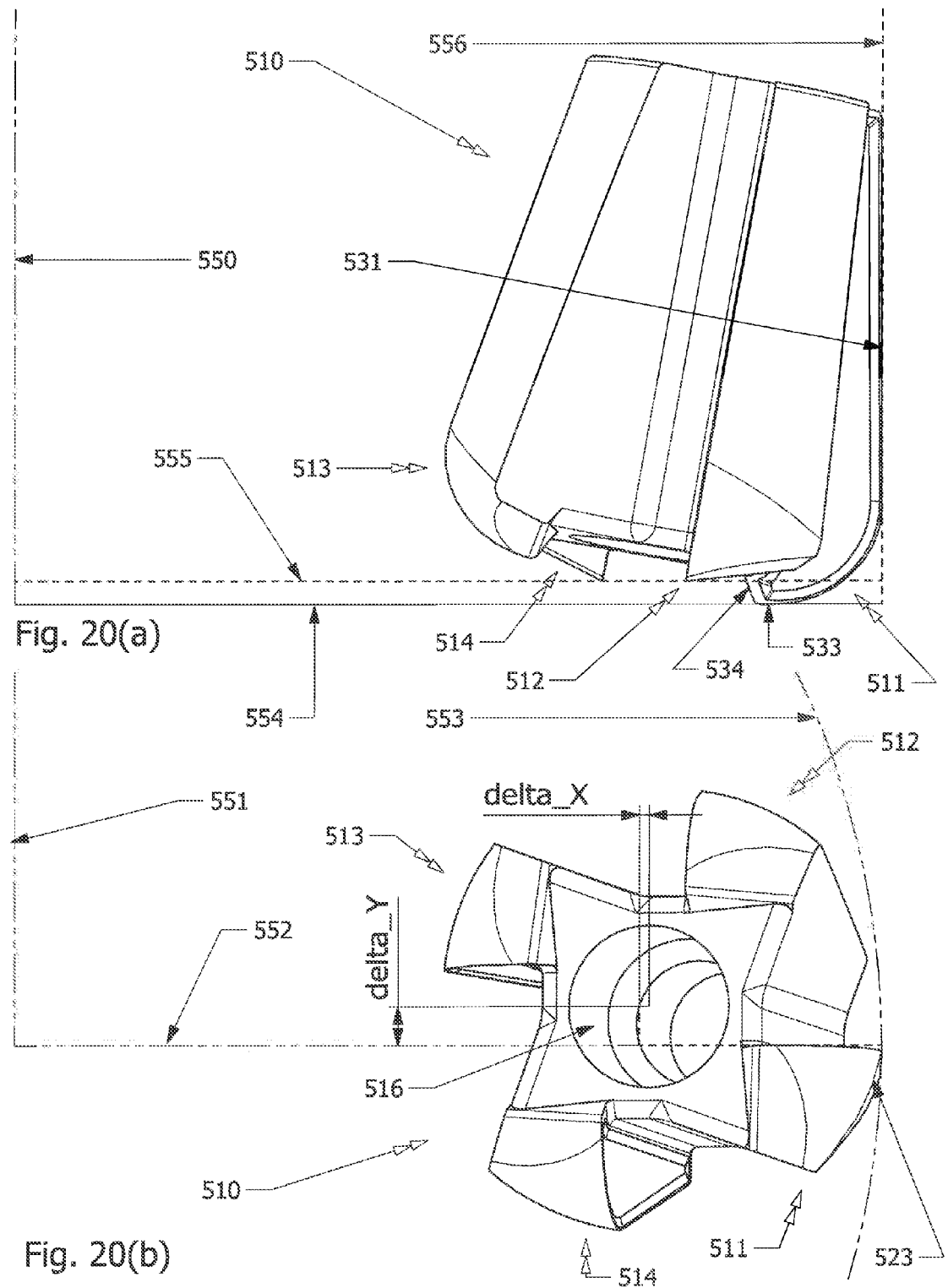
FIG. 20 shows a position of the cylindrical cutting insert of FIG. 19 when secured in an insert-receiving pocket of a tool holder with FIG. 20(a) for a side view and FIG. 20(b) as a three-dimensional perspective view.

FIG. 20 demonstrates the position of a cylindrical cutting insert 510 (same cutting insert as that in FIG. 19) when it is secured in an insert-receiving pocket (not shown) of a tool holder with FIG. 20(a) for a side view and FIG. 20(b) for a front-end view. In FIG. 20(a), the vertical line 550 represents the cutting axis of a tool holder (not shown) where a cylindrical cutting insert 510 is mounted, the line 554 represents the surface of a workpiece being machined, line 556 represents a machined wall that is substantially perpendicular to the workpiece surface 554, and line 555 represents the lowest positions of the non-engaging cutting teeth 512 and 514 when the cylindrical cutting insert 510 is positioned on the tool holder. In FIG. 20(b), the line 551 represents the Y center line and line 552 represents the X center line of the cutting diameter circle 553 of a tool holder. The central position of the cylindrical cutting insert 510 on a tool holder has an offset delta_X and an offset delta_Y for the same reason as already demonstrated in FIG. 18, that is, forming a positive radial clearance surface between the cylindrical surface 523 and the cutting diameter circle 553 as shown in FIG. 20(b).

As shown in FIG. 20(a), the cylindrical cutting insert 510 is positioned on a tool holder in a way that the straight cutting edge 533 of the engaging cutting tooth 511 is perpendicular to the cutting axis 550 or aligned with the workpiece surface in order to produce good surface finish and meanwhile the long cutting edge 531 of the engaging cutting tooth 511 will generate a substantially 90 degree wall 556 on the shoulder of the workpiece. The space between the workpiece surface 554 and the line 555 defined by the lowest non-engaging cutting teeth 512 and 514 determines the range that the ramping cutting edge 534 of the engaging cutting tooth 511 is able to perform during a ramping operation.

FIG. 21 shows another embodiment according to this invention for a cylindrical cutting insert 610 with FIG. 21(a) for a perspective view, FIG. 21(b) for a side view and FIG. 21(c) for a sectioned view from section D-D in FIG. 21(b). The cylindrical cutting insert 610 is very similar to the cylindrical cutting insert 510 illustrated in FIG. 19 except that each positive cutting tooth 611 of the cylindrical cutting insert 610 comprises two radial cutting clearance faces 623a, 623b, two conical or cylindrical cutting clearance faces 624a, 624b, and two axial cutting clearance faces 625a, 625b. Same as the cylindrical cutting insert 510 in FIG. 19, the cylindrical cutting insert 610 shown in FIG. 21 has a generally tapered or conical profile and comprises four identical and indexable cutting teeth 611, 612, 613 and 614 which are rotational symmetric around the center axis 615 of the fastener bore 616. Each cutting tooth 611 comprises a main cutting edge 631, a curved cutting edge 632, a straight (or wiper) cutting edge 633 and a ramping cutting edge 634, all at the top face 621 of the cutting tooth 611. Each cutting tooth 611 has a top face 621, a bottom face 622, a planar radial clearance face 623a extended from the main cutting edge 631 and a cylindrical clearance face 623b which is a portion of the original tapered cylindrical periphery of the cylindrical cutting insert 610, a conical (or cylindrical) clearance face 624a and a second conical (or cylindrical) clearance face 624b, and an axial clearance face 625a and a second axial clearance face 625b, and a ramping clearance face 629 (on cutting tooth 614 in FIG. 21(a) due to invisible on cutting tooth 611).

Furthermore, certain non-limiting embodiments according to the present invention disclosure are related to prismatic and cylindrical cutting inserts and associated tool holders for milling operations. It will be understood, however, that inserts and tool holders within the scope of the present invention disclosure may be embodied in forms and applied to end uses that are not specifically and expressly described herein. For example, one skilled in the art will appreciate that embodiments within the scope of the present disclosure and the following claims may be manufactured as prismatic and cylindrical cutting inserts and/or tool holders adapted for other methods of removing metal from all types of work materials.

It will be understood that the present description illustrates those aspects of the invention relevant to a clear understanding of the invention. Certain aspects that would be apparent to those of ordinary skill in the art and that, therefore, would not facilitate a better understanding of the invention have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the following claims.

What is claimed is:
1. A prismatic and cylindrical cutting insert, comprising:
a plurality of at least three cutting teeth, each cutting tooth comprising:
a top face;
a radial clearance face;
an axial clearance face;
a conical clearance face;
a long cutting edge at an intersection of the top face and the radial clearance face;
a nose corner cutting edge at an intersection of the top face and the conical clearance face; and
a straight cutting edge at an intersection of the top face and the axial clearance face,
wherein at least one cutting tooth further comprises a ramping cutting edge.

2. The cutting insert of claim 1, wherein the plurality of cutting teeth are rotationally symmetric about a center axis of a center screw hole.

3. The cutting insert of claim 1, wherein a number of cutting teeth is between three and twenty.

4. The cutting insert of claim 1, wherein the top face comprises one of a planar surface, a planar surface with an axial rake angle and a radial rake angle, a chip groove, a chip breaker, or a combination thereof.

5. The cutting insert of claim 1, wherein at least one cutting tooth lacks a straight cutting edge at the intersection of the top face and the first axial clearance face.

6. The cutting insert of claim 1, wherein at least one cutting tooth comprises a built-in hard tool tip.

7. A tool holder, comprising:
an insert-receiving pocket being built-in around a periphery of said tool holder and comprising a bottom seating face, a radial seating face and a peripheral seating face; and
a prismatic and cylindrical cutting insert mounted in the insert-receiving pocket, the cutting insert comprising a plurality of at least three cutting teeth, each cutting tooth comprising a top face, a radial clearance face, an axial clearance face, and a conical clearance face, a long cutting edge at an intersection of the top face and the radial clearance face, a nose corner cutting edge at an intersection of the top face and the conical clearance face, straight cutting edge at an intersection of the top face and the axial clearance face, and a ramping cutting edge.

8. The tool holder of claim 7, wherein the plurality of cutting teeth are rotationally symmetric about a center axis of a center screw hole.

9. The tool holder of claim 7, wherein a number of cutting teeth is between three and twenty.

10. The tool holder of claim 7, wherein the top face comprises one of a planar surface, a planar surface with an axial rake angle and a radial rake angle, a chip groove, a chip breaker, a geometric combination of a planar surface, or a chip groove and a chip breaker.

11. The tool holder of claim 7, wherein a cutting tooth lacks a straight cutting edge at the intersection of the top face and the first axial clearance face.

12. The tool holder of claim 7, wherein a cutting tooth comprises a built-in hard tool tip.

13. A cylindrical cutting insert comprising:
a plurality of at least three positive cutting teeth, each cutting tooth comprising:
a top face;
a bottom face;
two radial clearance faces;
two axial clearance faces;
two conical clearance faces;
a main cutting edge at an intersection of the top face and one of the two radial clearance faces;
a nose corner cutting edge at an intersection of the top face and one of the two conical clearance faces;
a straight cutting edge at an intersection of the top face and one of the two axial clearance faces; and
a ramping cutting edge.

14. The cutting insert of claim 13, wherein one of the two axial clearance faces is a cylindrical face.

15. The cutting insert of claim 13, wherein the plurality of cutting teeth are rotationally symmetric about a center axis of a center screw hole.

16. The cutting insert of claim 13, wherein the top face is in a form of a planar surface, a planar surface with an axial rake angle and a radial rake angle, a chip groove, a chip breaker, and a geometric combination of a planar surface, or a chip groove and a chip breaker.

17. The cutting insert of claim 13, wherein a cutting tooth comprises a built-in hard tool tip.

\* \* \* \* \*